(12) United States Patent
Pourreza et al.

(10) Patent No.: US 12,177,473 B2
(45) Date of Patent: Dec. 24, 2024

(54) VIDEO CODING USING OPTICAL FLOW AND RESIDUAL PREDICTORS

(71) Applicant: QUALCOMM Incorporated, San Diego, CA (US)

(72) Inventors: Reza Pourreza, San Diego, CA (US); Hoang Cong Minh Le, La Jolla, CA (US); Auke Joris Wiggers, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/862,217

(22) Filed: Jul. 11, 2022

(65) Prior Publication Data

US 2024/0015318 A1 Jan. 11, 2024

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/137* (2014.11); *H04N 19/172* (2014.11)

(58) Field of Classification Search
CPC .... H04N 19/52; H04N 19/105; H04N 19/137; H04N 19/172
See application file for complete search history.

(56) References Cited

U.S. PATENT DOCUMENTS

| | | | |
|---|---|---|---|
| 2011/0096832 A1* | 4/2011 | Zhang | H04N 13/261 382/162 |
| 2019/0138889 A1* | 5/2019 | Jiang | G06N 3/045 |

(Continued)

FOREIGN PATENT DOCUMENTS

| | | |
|---|---|---|
| CN | 110913230 A | 3/2020 |
| CN | 113613003 A | 11/2021 |

OTHER PUBLICATIONS

Browne A., et al., "Algorithm Description for Versatile Video Coding and Test Model 16 (VTM 16)", 25th JVET Meeting, Jan. 12, 2022-Jan. 21, 2022, Teleconference, (The Joint Video Exploration Team of ISO/IEC JTC1/SC29/WG11 and ITU-T SG. 16 WP 3), No. JVET-Y2002, m59197, Mar. 30, 2022, 126 Pages, XP030302159, The whole document.

Hui T.W ., et al., "LiteFlowNet: A Lightweight Convolutional Neural Network for Optical Flow Estimation", 2018 IEEE/CVF Conference on Computer Vision and Pattern Recognition, Jun. 18, 2018, pp. 8981-8989, XP033473823, The whole document.

(Continued)

*Primary Examiner* — Jeremiah C Hallenbeck-Huber
(74) *Attorney, Agent, or Firm* — Polsinelli LLP/Qualcomm Incorporated

(57) ABSTRACT

Systems and techniques are provided for coding video data based on an optical flow correction and a residual correction. For example, a decoding device can obtain a frame of encoded video data associated with an input frame, the frame of encoded video data including an optical flow correction and a residual correction. A predicted optical flow can be generated based on one or more reference frames and a reference optical flow. A corrected prediction frame can be generated based on the predicted optical flow and the optical flow correction. A predicted residual can be generated based on at least the corrected prediction frame and a first reference frame included in the one or more reference frames. The decoding device can generate a reconstructed input frame based on the corrected prediction frame, the predicted residual, and the residual correction.

27 Claims, 13 Drawing Sheets

(51) Int. Cl.
 *H04N 19/137* (2014.01)
 *H04N 19/172* (2014.01)

(56) References Cited

U.S. PATENT DOCUMENTS

| | | | |
|---|---|---|---|
| 2020/0288169 A1* | 9/2020 | Liu | H04N 19/176 |
| 2022/0210402 A1* | 6/2022 | Li | H04N 19/172 |
| 2022/0272355 A1* | 8/2022 | Singh | H04N 23/632 |
| 2022/0272372 A1* | 8/2022 | Dinh | H04N 19/513 |
| 2022/0303568 A1* | 9/2022 | Pourreza | H04N 19/137 |
| 2022/0394240 A1* | 12/2022 | Zhang | H04N 19/105 |
| 2024/0005587 A1* | 1/2024 | Kulkarni | G06T 13/80 |

OTHER PUBLICATIONS

International Search Report and Written Opinion—PCT/US2023/068184—ISA/EPO—Aug. 4, 2023.
Pourreza R., et al., "Extending Neural P-frame Codecs For B-frame Coding", 2021 IEEE/CVF International Conference on Computer Vision (ICCV), Oct. 10, 2021, pp. 6660-6669, XP034092812, abstract, figures 3,4 paragraphs [0003], [0004].
Rho D., et al., "Neural Residual Flow Fields for Efficient Video Representations", Arxiv.org, arXiv:2201.04329v2 [cs.CV], Cornell University Library, 201 Olin Library Cornell University Ithaca, NY 14853, Jan. 12, 2022, 14 Pages, XP091138797, The whole document.

* cited by examiner

VIDEO CODING USING OPTICAL FLOW AND RESIDUAL PREDICTORS

FIELD

The present disclosure generally relates to video coding (e.g., encoding and/or decoding video data). For example, aspects of the present disclosure are related to systems and techniques for performing video coding (e.g., predicted frame (P-frame) coding) using one or more machine learning networks (e.g., neural networks).

BACKGROUND

Many devices and systems allow video data to be processed and output for consumption. Digital video data includes large amounts of data to meet increasing demands in video quality, performance, and features. For example, consumers of video data typically desire high quality videos, with high fidelity, resolutions, frame rates, and the like. As a result, the large amount of video data often needed to meet these demands places a burden on communication networks and devices that process and store the video data.

Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some examples, systems and techniques are described for coding (e.g., encoding and/or decoding) video data using a machine learning architecture. For example, the systems and techniques can use one or more machine learning networks (e.g., neural networks) to perform video coding (e.g., predicted frame (P-frame) coding) based on one or more of a predicted optical flow and a predicted residual. According to at least one illustrative example, an apparatus for decoding video data is provided that includes at least one memory (e.g., configured to store data, such as virtual content data, one or more images, etc.) and one or more processors (e.g., implemented in circuitry) coupled to the at least one memory. The one or more processors are configured to and can: obtain a frame of encoded video data associated with an input frame, the frame of encoded video data including an optical flow correction and a residual correction; generate a predicted optical flow based on one or more reference frames and a reference optical flow; generate a corrected prediction frame based on the predicted optical flow and the optical flow correction; generate a predicted residual based on at least the corrected prediction frame and a first reference frame included in the one or more reference frames; and generate, based on the corrected prediction frame, the predicted residual, and the residual correction, a reconstructed input frame.

In another example, an apparatus for encoding video data is provided that includes at least one memory (e.g., configured to store data, such as virtual content data, one or more images, etc.) and one or more processors (e.g., implemented in circuitry) coupled to the at least one memory. The one or more processors are configured to and can: determine an optical flow and a residual correction associated with a frame of video data; generate a predicted optical flow based on one or more reference frames and a reference optical flow; determine an optical flow correction based on a difference between the predicted optical flow and the optical flow associated with the frame of video data; generate a corrected prediction frame based on the predicted optical flow and the optical flow correction; generate a predicted residual based on at least the corrected prediction frame and a first reference frame included in the one or more reference frames; and determine a residual correction based on a difference between the frame of video data and a reconstructed input frame generated based on the corrected prediction frame, and the predicted residual.

In another example, a method for decoding video data is provided, the method including: obtaining a frame of encoded video data associated with an input frame, the frame of encoded video data including an optical flow correction and a residual correction; generating a predicted optical flow based on one or more reference frames and a reference optical flow; generating a corrected prediction frame based on the predicted optical flow and the optical flow correction; generating a predicted residual based on at least the corrected prediction frame and a first reference frame included in the one or more reference frames; and generating, based on the corrected prediction frame, the predicted residual, and the residual correction, a reconstructed input frame.

In another example, a method for encoding video data is provided, the method including: determining an optical flow and a residual correction associated with a frame of video data; generating a predicted optical flow based on one or more reference frames and a reference optical flow; determining an optical flow correction based on a difference between the predicted optical flow and the optical flow associated with the frame of video data; generating a corrected prediction frame based on the predicted optical flow and the optical flow correction; generating a predicted residual based on at least the corrected prediction frame and a first reference frame included in the one or more reference frames; and determining a residual correction based on a difference between the frame of video data and a reconstructed input frame generated based on the corrected prediction frame, and the predicted residual.

In another example, a non-transitory computer-readable medium is provided that has stored thereon instructions that, when executed by one or more processors, cause the one or more processors to: obtain a frame of encoded video data associated with an input frame, the frame of encoded video data including an optical flow correction and a residual correction; generate a predicted optical flow based on one or more reference frames and a reference optical flow; generate a corrected prediction frame based on the predicted optical flow and the optical flow correction; generate a predicted residual based on at least the corrected prediction frame and a first reference frame included in the one or more reference frames; and generate, based on the corrected prediction frame, the predicted residual, and the residual correction, a reconstructed input frame.

In another example, a non-transitory computer-readable medium is provided that has stored thereon instructions that, when executed by one or more processors, cause the one or more processors to: determine an optical flow and a residual correction associated with a frame of video data; generate a predicted optical flow based on one or more reference frames and a reference optical flow; determine an optical flow correction based on a difference between the predicted optical flow and the optical flow associated with the frame of video data; generate a corrected prediction frame based on the predicted optical flow and the optical flow correction;

generate a predicted residual based on at least the corrected prediction frame and a first reference frame included in the one or more reference frames; and determine a residual correction based on a difference between the frame of video data and a reconstructed input frame generated based on the corrected prediction frame, and the predicted residual.

In another example, an apparatus for decoding video data is provided. The apparatus includes: means for obtaining a frame of encoded video data associated with an input frame, the frame of encoded video data including an optical flow correction and a residual correction; means for generating a predicted optical flow based on one or more reference frames and a reference optical flow; means for generating a corrected prediction frame based on the predicted optical flow and the optical flow correction; means for generating a predicted residual based on at least the corrected prediction frame and a first reference frame included in the one or more reference frames; and means for generating, based on the corrected prediction frame, the predicted residual, and the residual correction, a reconstructed input frame.

In another example, an apparatus for encoding video data is provided. The apparatus includes: means for determining an optical flow and a residual correction associated with a frame of video data; means for generating a predicted optical flow based on one or more reference frames and a reference optical flow; means for determining an optical flow correction based on a difference between the predicted optical flow and the optical flow associated with the frame of video data; means for generating a corrected prediction frame based on the predicted optical flow and the optical flow correction; means for generating a predicted residual based on at least the corrected prediction frame and a first reference frame included in the one or more reference frames; means for and determining a residual correction based on a difference between the frame of video data and a reconstructed input frame generated based on the corrected prediction frame, and the predicted residual.

In some aspects, the apparatus can include or be part of a mobile device (e.g., a mobile telephone or other mobile device), an extended reality device (e.g., a virtual reality (VR) device, an augmented reality (AR) device, or a mixed reality (MR) device), a wearable device (e.g., a network-connected watch or other wearable device), a personal computer, a laptop computer, a server computer, a television, a video game console, or other device. In some aspects, the apparatus comprises a mobile device (e.g., a mobile telephone or so-called "smart phone"). In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit the reconstructed video frame over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
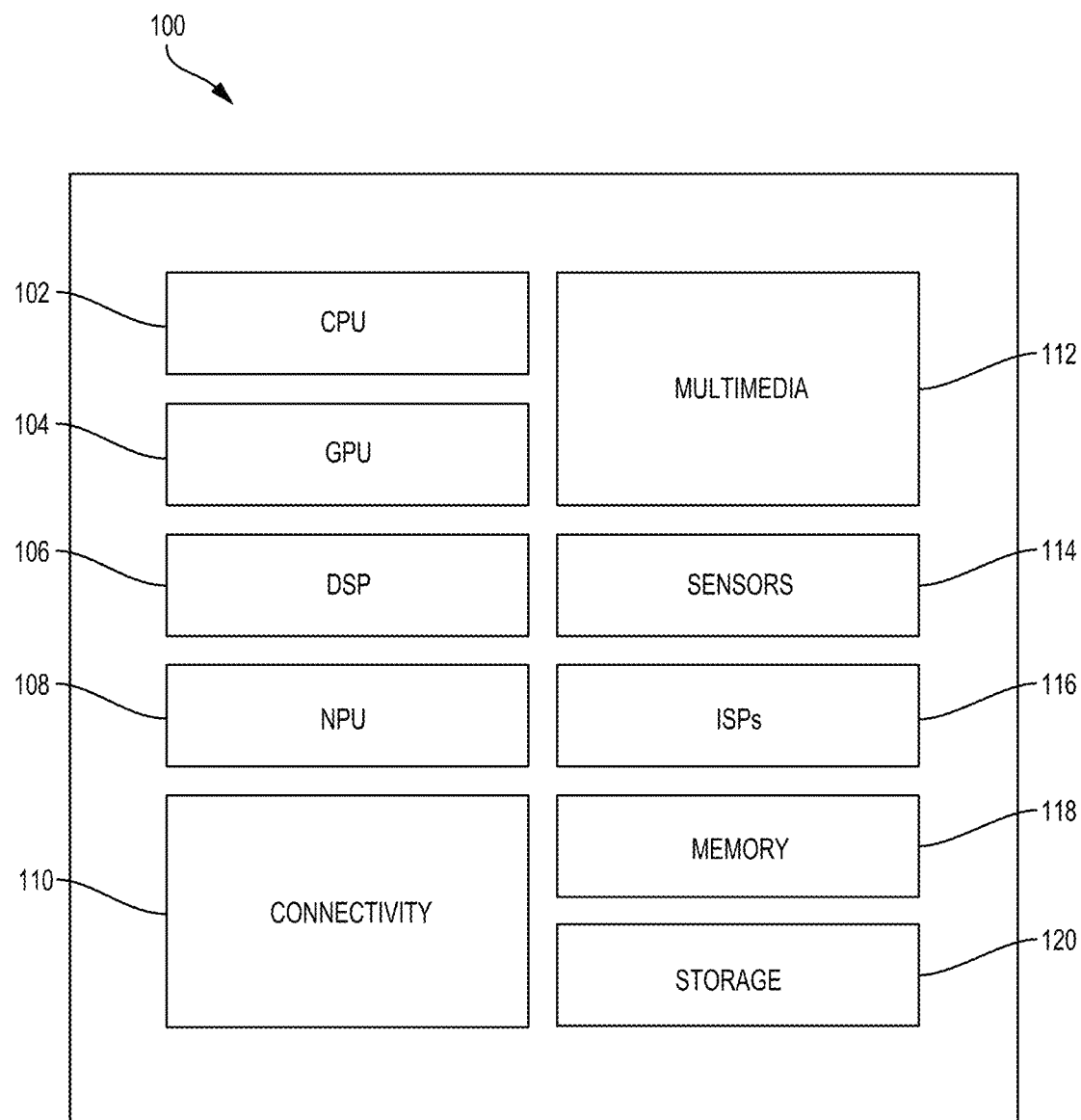
FIG. 1 illustrates an example image processing system which can implement the various techniques described herein, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims Digital video data can include large amounts of data, particularly as the demand for high quality video data continues to grow. For example, consumers of video data typically desire video of increasingly high quality, with high fidelity, resolution, frame rates, and the like. However, the large amount of video data often needed to meet such demands can place a significant burden on communication networks as well devices that process and store the video data.

Various techniques can be used to code video data. In some cases, video coding can be performed according to a particular video coding standard and/or scheme. Example video coding standards include high-efficiency video coding (HEVC), advanced video coding (AVC), moving picture experts group (MPEG) coding, versatile video coding (VVC), among others. One goal of video coding techniques is to compress video data into a form that uses a lower bit rate, while avoiding or minimizing degradations in the video quality. As the demand for video services grows and new video services become available, coding techniques with better efficiency and performance are needed.

Video coding can use prediction methods such as intra-prediction or inter-prediction, which take advantage of redundancies present in video frames or other sequences of images or frames. Intra-prediction is performed using the data within a single frame of video, and is based on the spatial characteristics of the frame. Frames coded using intra-prediction are referred to as I-frames. Inter-prediction of a frame is performed based on temporal characteristics of the frame relative to other frames. For example, inter-prediction of a video frame can be performed by identifying regions of other video frames that include changes relative to the video frame and regions that include redundancies relative to the video frame (e.g., background regions that remain largely unchanged). The redundancies can be removed, resulting in a residual for the video frame. The residual can be further encoded (e.g., using entropy coding), and the result can be included in a bitstream that is stored, transmitted, or otherwise output.

Examples of inter-prediction include unidirectional prediction (uni-prediction) and bidirectional prediction (bi-prediction). Uni-prediction includes the use of a single reference frame when performing inter-prediction of a frame. Frames coded using uni-prediction are referred to as predicted frames (P-frames). Bi-prediction involves the use of two reference frames when performing inter-prediction of a frame. Frames coded using bi-prediction are referred to as bi-predicted frames (B-frames).

In some cases, machine learning systems can be used to perform video encoding (compression) and decoding (decompression). In general, machine learning (ML) is a subset of artificial intelligence (AI). ML systems include algorithms and statistical models that computer systems can use to perform various tasks by relying on patterns and inference. One example of a ML system is a neural network (also referred to as an artificial neural network), which can include an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing operations on the data. The results of the operations performed on the input data are selectively passed to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network. For instance, weight values may be established during a training phase in which the network learns how to identify particular classes by their typical input data characteristics. In one example, the network may be trained to learn a particular task by adapting values of parameters associated with the neurons (e.g., activation parameters and/or weights, biases, etc.), adding and/or removing neurons or even layers of neurons, adding or removing edges between neurons, etc.

Different types of neural networks exist, such as autoencoders, convolutional neural networks (CNNs), recurrent neural networks (RNNs), multilayer perceptron (MLP) neural networks, among others. Convolutional neural networks may include collections of artificial neurons that each have a receptive field (e.g., a spatially localized region of an input space) and that collectively tile an input space. Convolutional neural networks have numerous applications. For example, CNNs can be broadly used in the area of pattern recognition and classification. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, machine learning based P-frame and B-frame coding systems can be used to perform uni-prediction and bi-prediction, respectively. In some cases, such systems can include neural network architectures (e.g., one or more deep neural networks, such as one or more autoencoders). An example of a machine learning based P-frame coding system can perform motion compression and motion compensation on a current frame and a reference frame to determine a prediction of motion between the current frame and the reference frame. The motion prediction can be used to modify the pixels of the reference frame (e.g., by moving the pixels of the reference frame according to motion vectors included in the motion prediction), resulting in a prediction for the current frame. A residual portion of the P-frame coding system can generate a predicted residual representing a difference between the prediction and the current frame. The predicted residual can be combined with the prediction to generate a reconstructed current frame.

Systems, methods (also referred to as processes), apparatuses, and computer-readable media (collectively referred to as "systems and techniques") are described herein for performing coding of video data (e.g., P-frame coding of video data) using optical flow and residual predictors. As used herein, the term coding can refer to encoding (e.g., compression), decoding (e.g., decompression), or both encoding and decoding. For example, a P-frame coding system is provided that includes an optical flow prediction engine for generating a predicted optical flow map based on one or more reference frames and a reference (e.g., previously generated) optical flow map. The P-frame coding system can additionally include a residual prediction engine for generating a predicted residual map based on one or more motion compensated prediction frames and a first reference frame. While aspects are described herein using P-frame coding and predictors for illustrative purposes, the systems and techniques can be applied to B-frames.

In some examples, the systems and techniques can be used to perform P-frame coding using one or more neural networks and/or autoencoders. For example, the optical flow prediction engine and/or the residual prediction engine can each include one or more autoencoders, encoder neural networks, decoder neural networks, etc. In some cases, the optical flow prediction engine and the residual prediction engine can be used to encode inter-frames of video data (e.g., a current or input frame $X_t$) based on second-order temporal redundancies that may be included in optical flow maps and/or residual maps generated for successive inter-frames $X_t$, $X_{t-1}$, $X_{t-2}$, . . . , of the video data. These second-order temporal redundancies may be present based on a relatively high degree of similarity between the optical flow maps and/or residual maps determined for successive inter-frames $X_n$. For example, successive optical flow maps and/or residual map may include temporal redundancies because the motion that is present between successive frames $X_t$ and $X_{t-1}$ (e.g., successive inter-frames) of natural video data is often smooth or otherwise relatively small/minor.

In some examples, the systems and techniques can encode inter-frames of video data based at least in part on generating a predicted optical flow map $f_t^p$ and a predicted residual map $r_t^p$ for the current frame $X_t$. In some cases, the optical flow prediction engine can generate the predicted optical flow map $f_t^p$ based on one or more previously reconstructed (e.g., previously decoded) inter-frames, $\hat{X}_{t-1}$ and $\hat{X}_{t-2}$, and a previous optical flow map $\hat{f}_{t-1}$. In some examples, the same predicted optical flow map $f_t^p$ can be generated independently by a neural video encoder and a neural video decoder (e.g., each implementing some or all of the example neural P-frame coding system described herein), because the one or more previously decoded inter-frames, $\hat{X}_{t-1}$ and $\hat{X}_{t-2}$, and the previous optical flow map, $\hat{f}_{t-1}$, are already known to both the neural video encoder and the neural video decoder.

The residual prediction engine can generate the predicted residual map $r_t^p$ based on a current motion-compensated frame $X_t^w$, a previously generated (e.g., reference) motion-compensated prediction frame $X_{t-1}^w$, and the previously reconstructed (e.g., previously decoded) inter-frame $\hat{X}_{t-1}$.

As described above with respect to the predicted optical flow map $f_t^p$, in some examples the same predicted residual map $r_t^p$ can be generated independently by a neural video encoder and a neural video decoder (e.g., each implementing some or all of the example neural P-frame coding system described herein), because the motion-compensated frames, $X_t^w$ and $X_{t-1}^w$, and the previously decoded inter-frame, $\hat{X}_{t-1}$, are already known to both the neural video encoder and the neural video decoder.

In some examples, a neural video encoder can encode a current inter-frame $X_t$ based on generating a predicted frame $X_t^p$ using the predicted optical flow map $f_t^p$, and correcting the predicted optical flow map $f_t^p$ by generating a delta-corrected optical flow $\Delta \hat{f}_t$ using an optical flow autoencoder. The optical flow autoencoder can generate the delta-corrected optical flow $\Delta \hat{f}_t$ using an encoder network and a decoder network. Because the neural video encoder and a corresponding neural video decoder can both independently generate the predicted frame $X_t^p$, the neural video decoder can obtain the delta-corrected optical flow $\Delta \hat{f}_t$ generated by the neural video encoder (e.g., rather than the decoder needing to obtain a complete optical flow map $\hat{f}_t$ for decoding). For example, the neural video encoder can be part of a first device that can transmit the delta-corrected optical flow $\Delta \hat{f}_t$ to a second device including the neural video decoder (e.g., rather than the first device needing to transmit a complete optical flow map $\hat{f}_t$ for the neural video decoder to decode the data). In another example, the neural video encoder of the first device can store the delta-corrected optical flow $\Delta \hat{f}_t$ in a storage of the first device, and a neural video decoder of the first device can retrieve the delta-corrected optical flow $\Delta \hat{f}_t$ from the storage. In either example, the neural video decoder can perform local correction of the predicted frame $X_t^p$ based on obtaining (e.g., receiving from another device, retrieving from memory, etc.) the delta-corrected optical flow $\Delta \hat{f}_t$. The corrected prediction frame can be the delta-corrected and motion-compensated frame $X_t^w$.

The neural video encoder can additionally generate a residual-compensated frame $X_t^r$ using the predicted residual map $r_t^p$ and the delta-corrected motion-compensated frame $X_t^w$. The residual-compensated frame $X_t^r$ can be corrected by generating a delta-corrected residual $\Delta \hat{r}_t$. The residual compression system can generate the delta-corrected residual $\Delta \hat{r}_t$ using an encoder network and a decoder network. In some cases, the encoder network and the decoder network can be included in a residual autoencoder (e.g., the residual compression system can be implemented as a residual autoencoder). Because the neural video encoder and the corresponding neural video decoder can both generate the residual-compensated frame $X_t^r$, the neural video encoder can transmit the delta-corrected residual $\Delta \hat{r}_t$ to the neural video decoder (e.g., rather than needing to transmit a complete residual map $\hat{r}_t$), and the neural video decoder can perform local correction of the residual-compensated frame $X_t^r$ based on receiving the delta-corrected residual $\Delta \hat{r}_t$.

Based on correcting the locally generated prediction frame $X_t^p$ (e.g., based on receiving the delta-corrected optical flow $\Delta \hat{f}_t$ from the neural video encoder), and correcting the locally generated residual-compensated frame $X_t^r$ (e.g., based on receiving the delta-corrected residual $\Delta \hat{r}_t$ from the neural video encoder), the neural video decoder can generate the reconstructed frame $\hat{X}_t$. For example, the neural video decoder can generate the reconstructed frame $\hat{X}_t$ based on adding or otherwise combining the residual-compensated frame $X_t^r$ and the delta-corrected residual $\Delta \hat{r}_t$ (e.g., $\hat{X}_t = X_t^r + \Delta \hat{r}_t$).

Further aspects of the systems and techniques will be described with respect to the figures. FIG. 1 illustrates an example implementation of an image processing system 100 that, in some cases, can be used to implement the systems and techniques described herein. The image processing system 100 can include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, image data, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 and/or from a memory block 118.

The image processing system 100 can also include additional processing blocks for performing specific functions, such as a GPU 104; a DSP 106; a connectivity block 110, which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect image features. In some examples, the NPU 108 can be implemented in the CPU 102, DSP 106, and/or GPU 104. In some cases, the image processing system 100 may also include one or more sensor 114, one or more image signal processors (ISPs) 116, and/or storage 120.

In some examples, the image processing system 100 can implement an ARM instruction set architecture for one or more processors. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

The image processing system 100 and/or components thereof may be configured to perform video compression and/or decompression (also referred to as video encoding and/or decoding, collectively referred to as video coding) using techniques according to aspects of the present disclosure discussed herein. By using deep learning architectures and the techniques described herein to perform video compression and/or decompression, aspects of the present disclosure can increase the efficiency of video compression and/or decompression on a device and/or reduce associated resource requirements and/or usage. For example, a device using the video coding techniques described herein can compress video data more efficiently, can reduce the amount of data transmitted in compressed video data to a destination device, and the destination device can receive and decompress the compressed video data efficiently. In some examples, the deep learning architectures and techniques described herein can reduce the amount of data exchanged between coding devices or components, such as encoders and decoders, to code video content. The reduced amount of data transmitted for video coding can reduce latencies, increase performance, and reduce the cost or burden on computing resources such as, for example, bandwidth, memory, storage, power, compute, hardware, etc.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize features, such as edges, in the input stream. In another example, if presented with auditory data, the first layer may learn to recognize spectral power in specific frequencies. The second layer, taking the output of the first layer as input, may learn to recognize features, such as shapes for visual data or combinations of sounds for auditory data. For instance, higher layers may learn to represent complex shapes in visual data or words in auditory data. Still higher layers may learn to recognize common visual objects and/or spoken phrases.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
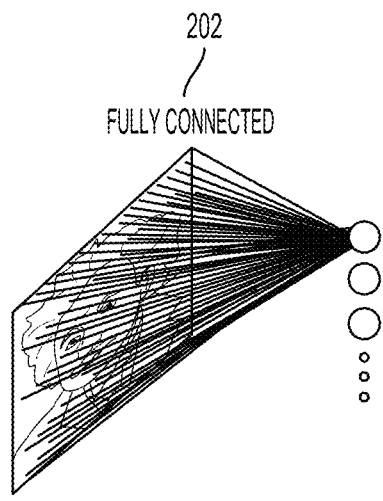
FIG. 2A illustrates an example of a fully connected neural network, in accordance with some examples.
Figure 2B:
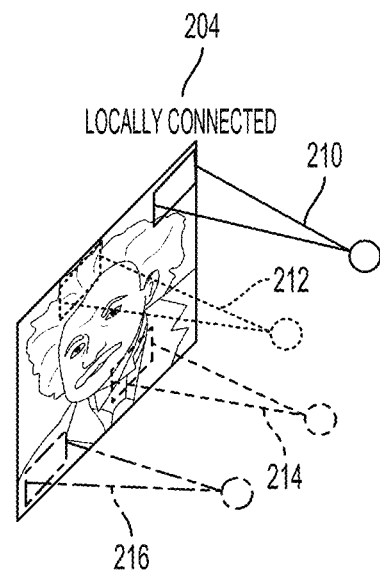
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
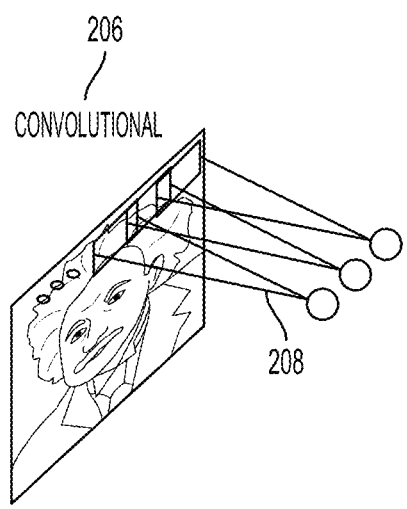
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
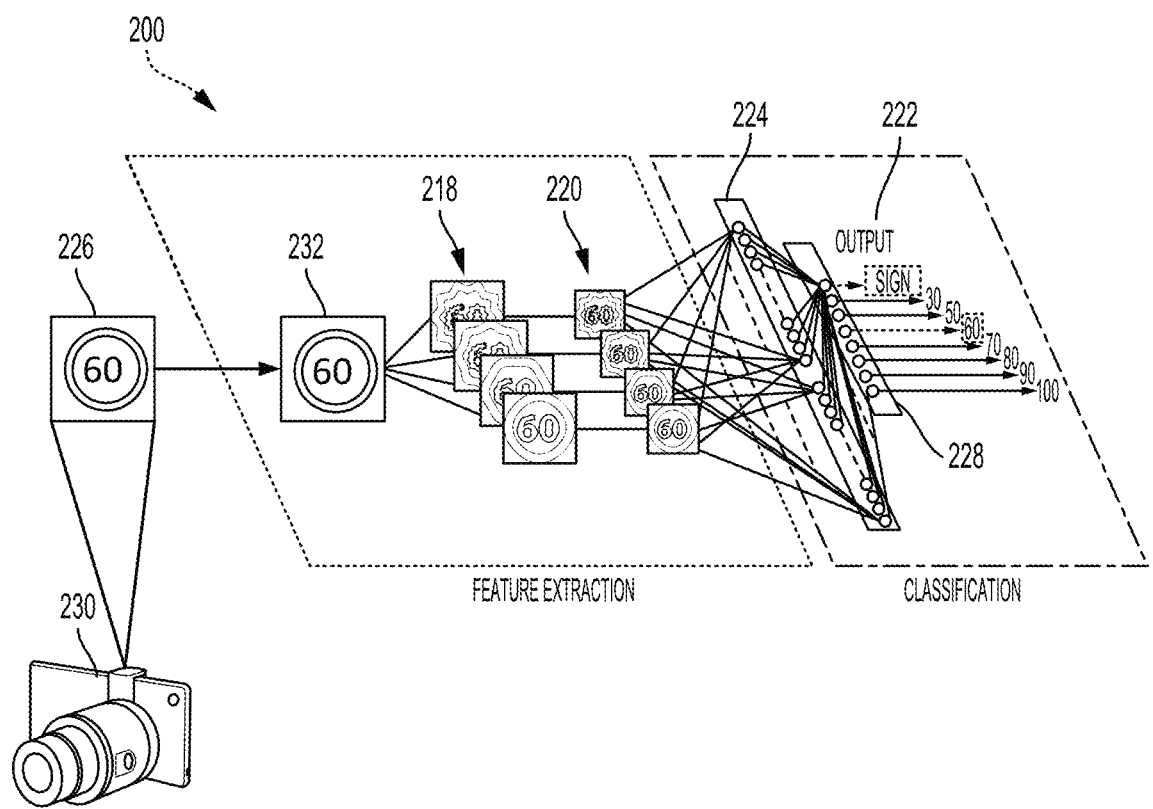
FIG. 2D illustrates a detailed example of a deep convolutional network (DCN) designed to recognize features from an image, in accordance with some examples.

One type of convolutional neural network is a deep convolutional network (DCN). FIG. 2D illustrates an example of a DCN 200 designed to recognize features from an image 226 input from an image capturing device 230, such as a camera or image sensor. In some examples, the DCN 200 of the current example may be trained to identify visual features in the image 226, such as one or more objects or signs in the image 226, for example.

In some examples, the DCN 200 may be trained with supervised learning. During training, the DCN 200 may be presented with an image, such as the image 226, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign", "60", and "100". A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30", "40", "50", "70", "80", "90", and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
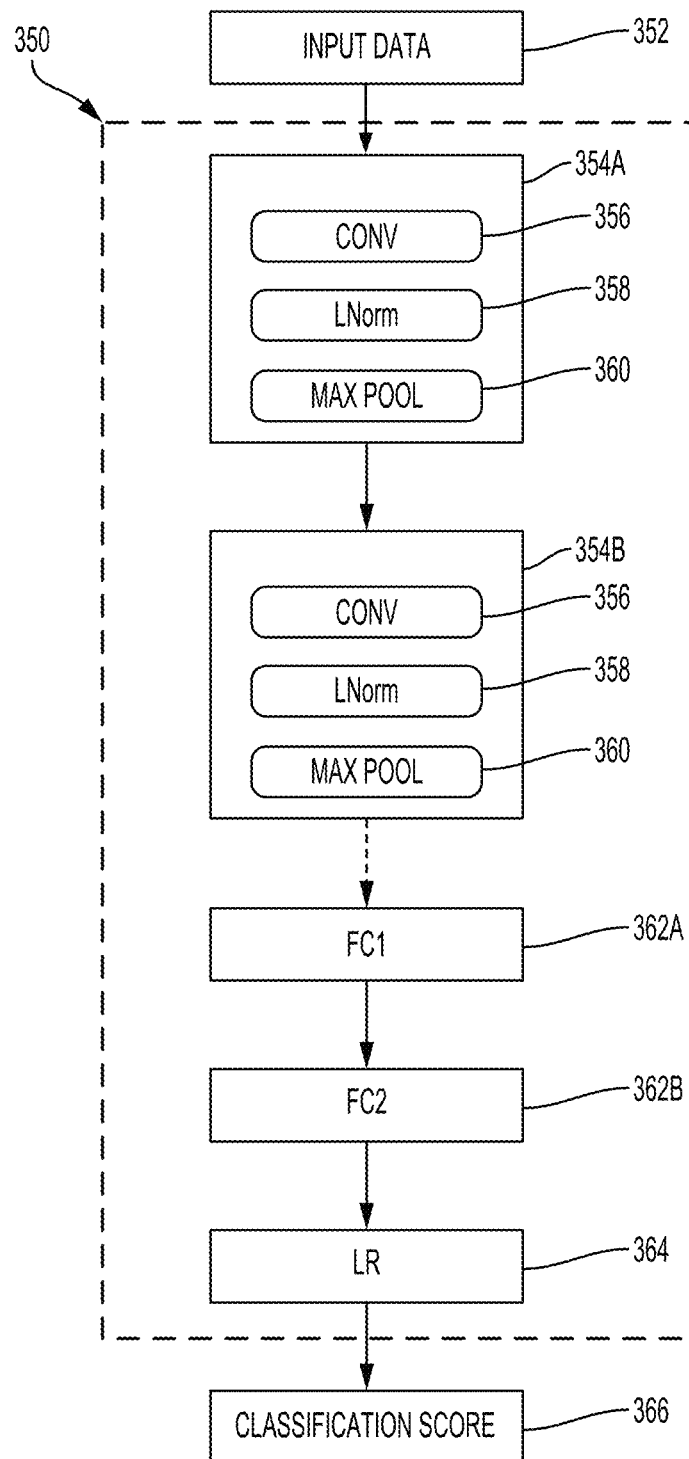
FIG. 3 is a block diagram illustrating another example DCN, in accordance with some examples.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In some examples, the parallel filter banks may be loaded on the DSP 106 or an ISP 116 of an image processing system 100. The deep convolutional network 350 may access other processing blocks that may be present on the image processing system 100.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Another type of neural network is an autoencoder. An autoencoder can be trained (e.g., using training data and one or more loss functions) to receive input and to generate a version of that input at its output (e.g., to essentially copy its input to its output). An autoencoder can be trained to learn efficient data codings in an unsupervised manner. For example, given an image of an object, an autoencoder can first encode the image into a lower dimensional latent representation, and can then decode the latent representation back to an image of the object. An autoencoder can learn (through training) to compress the input data while minimizing the reconstruction error.

As noted previously, digital video data can include large amounts of data, which can place a significant burden on communication networks and devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Thus, it is desirable to reduce the amount of bandwidth used to deliver video content in these networks.

Because uncompressed video content can result in large files that may involve sizable memory for physical storage and considerable bandwidth for transmission, video coding techniques can be utilized to compress and decompress such video content, as further described herein.

To reduce the size of video content—and thus the amount of storage involved to store video content and the amount of bandwidth involved in delivering video content—various video coding techniques can be performed according to a particular video coding standard and/or scheme, such as HEVC, AVC, MPEG, VVC, among others. Video coding can use prediction methods such as inter-prediction or intra-prediction, which take advantage of redundancies present in video images or sequences. One goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

An encoding device can encode video data according to a video coding standard to generate an encoded video bitstream. In some examples, an encoded video bitstream (or "video bitstream" or "bitstream") can include a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types can include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (unidirectional predicted frames) is a slice of a picture that may be coded with intra-prediction and with unidirectional inter-prediction. Each prediction unit or prediction block within a P slice is either coded with intra-prediction or inter-prediction. When inter-prediction applies, the prediction unit or prediction block is predicted by one reference picture, and therefore reference samples are from one reference region of one frame. A B slice (bidirectional predictive frames) is a slice of a picture that may be coded with intra-prediction and inter-prediction (e.g., either bi-prediction or uni-prediction). A prediction unit or prediction block of a B slice may be bidirectionally-predicted from two reference pictures. Each picture can contribute a reference region and sample sets of the two reference regions can be weighted (e.g., with equal weights or with different weights) to produce the prediction signal of the bidirectionally-predicted block. As explained above, slices of one picture are independently coded. In some cases, a picture can be coded as just one slice.

After performing prediction using intra- and/or inter-prediction, the encoding device can perform transformation and quantization. For example, following prediction, the encoding device may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some aspects, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as an end-to-end neural network-based image and video coding (E2E-NNVC) system. As described above, many E2E-NNVC systems are designed as combination of an autoencoder sub-network (the encoder sub-network) and a second sub-network responsible for learning a probabilistic model over quantized latents used for entropy coding. Such an architecture can be viewed as a combination of a transform plus quantization module (encoder sub-network) and the entropy modelling sub-network module.

Figure 4:
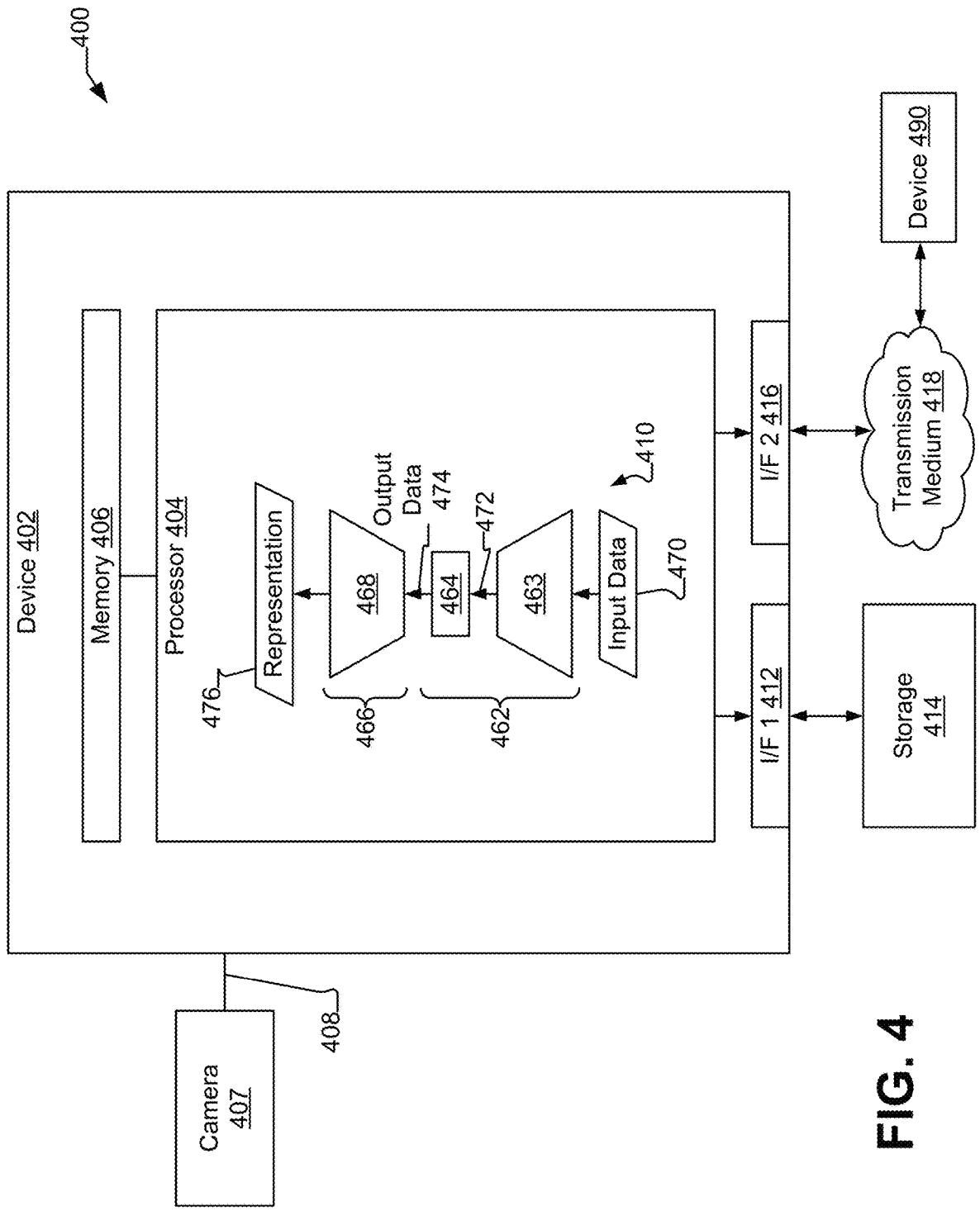
FIG. 4 is a diagram illustrating an example of a system including a device operable to perform image and/or video coding (e.g., encoding and decoding) using a neural network-based system, in accordance with some examples.

FIG. 4 depicts a system 400 that includes a device 402 configured to perform image and/or video encoding and decoding using an E2E-NNVC system 410. The device 402 is coupled to a camera 407 and a storage medium 414 (e.g., a data storage device). In some implementations, the camera 407 is configured to provide the image data 408 (e.g., a video data stream) to the processor 404 for encoding by the E2E-NNVC system 410. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes the E2E-NNVC system 410. The E2E-NNVC system 410 includes an encoder portion 462 and a decoder portion 466. In some implementations, the E2E-NNVC system 410 can include one or more autoencoders. The encoder portion 462 is configured to receive input data 470 and to process the input data 470 to generate output data 474 at least partially based on the input data 470.

In some implementations, the encoder portion 462 of the E2E-NNVC system 410 is configured to perform lossy compression of the input data 470 to generate the output data 474, so that the output data 474 has fewer bits than the input data 470. The encoder portion 462 can be trained to compress input data 470 (e.g., images or video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the E2E-NNVC system 410 may be excluded from the processor 404.

In some implementations, the encoder portion 462 of the E2E-NNVC system 410 can be trained to compress input data 470 (e.g., video frames) using motion compensation based on previous representations (e.g., one or more previously reconstructed frames). For example, the encoder portion 462 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information.

As shown, the encoder portion 462 of the E2E-NNVC system 410 can include a neural network 463 and a quantizer 464. The neural network 463 can include one or more transformers, one or more convolutional neural networks (CNNs), one or more fully connected neural networks, one or more gated recurrent units (GRUs), one or more Long Short-Term Memory (LSTM) networks, one or more ConvRNNs, one or more ConvGRUs, one or more ConvLSTMs, one or more GANs, any combination thereof, and/or other types of neural network architectures that generate(s) intermediate data 472. The intermediate data 472 is input to the quantizer 464.

The quantizer 464 is configured to perform quantization and in some cases entropy coding of the intermediate data 472 to produce the output data 474. The output data 474 can include the quantized (and in some cases entropy coded) data. The quantization operations performed by the quantizer 464 can result in the generation of quantized codes (or data representing quantized codes generated by the E2E-NNVC system 410) from the intermediate data 472. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding standards. In some examples, the quantization and/or entropy coding operations can be done by the E2E-NNVC system 410. In one illustrative example, the E2E-NNVC system 410 can be trained using supervised training, with residual data being used as input and quantized codes and entropy codes being used as known output (labels) during the training.

The decoder portion 466 of the E2E-NNVC system 410 is configured to receive the output data 474 (e.g., directly from quantizer 464 and/or from the storage medium 414). The decoder portion 466 can process the output data 474 to generate a representation 476 of the input data 470 at least partially based on the output data 474. In some examples, the decoder portion 466 of the E2E-NNVC system 410 includes a neural network 468 that may include one or more transformers, one or more CNNs, one or more fully connected neural networks, one or more GRUs, one or more LSTM networks, one or more ConvRNNs, one or more ConvGRUs, one or more ConvLSTMs, one or more GANs, any combination thereof, and/or other types of neural network architectures.

The processor 404 is configured to send the output data 474 to at least one of the transmission medium 418 or the storage medium 414. For example, the output data 474 may be stored at the storage medium 414 for later retrieval and decoding (or decompression) by the decoder portion 466 to generate the representation 476 of the input data 470 as reconstructed data. The reconstructed data can be used for various purposes, such as for playback of video data that has been encoded/compressed to generate the output data 474. In some implementations, the output data 474 may be decoded at another decoder device that matches the decoder portion 466 (e.g., in the device 402, in the second device 490, or in another device) to generate the representation 476 of the input data 470 as reconstructed data. For instance, the second device 490 may include a decoder that matches (or substantially matches) the decoder portion 466, and the output data 474 may be transmitted via the transmission medium 418 to the second device 490. The second device 490 can process the output data 474 to generate the representation 476 of the input data 470 as reconstructed data.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, and/or other wired interface) for performing communications over one or more hardwired connections, and/or other components that are not shown in FIG. 4.

In some implementations, the system 400 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein. In one example, the E2E-NNVC system 410 can be incorporated into a portable electronic device that includes the memory 406 coupled to the processor 404 and configured to store instructions executable by the processor 404, and a wireless transceiver coupled to an antenna and to the processor 404 and operable to transmit the output data 474 to a remote device.

Figure 5:
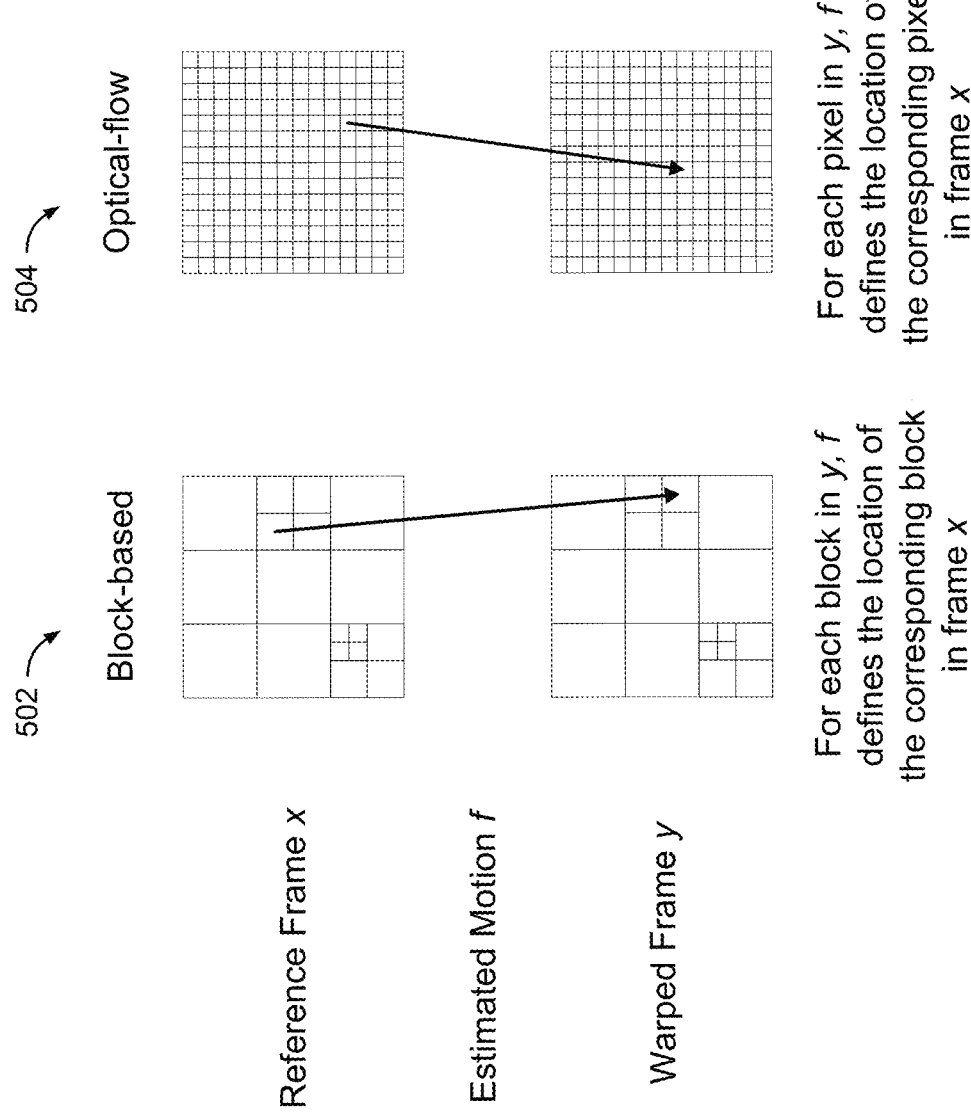
FIG. 5 is a diagram illustrating examples of motion estimation techniques, in accordance with some examples.

FIG. 5 is a diagram illustrating examples of different types of motion estimations that can be performed to determine motion information between reference frames (e.g., from a reference frame $\hat{X}_{ref_0}$ to a reference frame $\hat{X}_{ref_1}$ or vice versa). In FIG. 5, the term x denotes a reference frame from which motion can be estimated, the term f denotes a motion estimation, and the term y denotes a warped frame that can be computed as follows: y=f(x). One type of motion estimation is a block-based motion estimation technique 502. The block-based motion estimation can be performed on a block-by-block basis. For instance, for each block in the frame y, the motion estimation f defines the location of the corresponding block in the frame x. In one illustrative example, the motion estimation f can include a motion vector that indicates the displacement (e.g., the horizontal and vertical displacement) of a block in the frame y relative to the corresponding block in the frame x. A block from the frame x can be determined to correspond to a block in the frame y by determining a similarity (e.g., a similarity in pixel values) between the blocks.

Another type of motion estimation that can performed is an optical flow motion estimation technique 504. The optical flow motion estimation can be performed on a pixel-by-pixel basis. For instance, for each pixel in the frame y, the motion estimation f defines the location of the corresponding pixel in the frame x. The motion estimation f for each pixel can include a vector (e.g., a motion vector) indicating a movement of the pixel between the frames. In some cases, optical flow maps (e.g., also referred to as motion vector maps) can be generated based on the computation of the optical flow vectors between frames. The optical flow maps can include an optical flow vector for each pixel in a frame, where each vector indicates a movement of a pixel between the frames. In one illustrative example, the optical flow vector for a pixel can be a displacement vector (e.g., indicating horizontal and vertical displacements, such as x- and y-displacements) showing the movement of a pixel from a first frame to a second frame.

In some cases, the optical flow map can include vectors for less than all pixels in a frame. For instance, a dense optical flow can be computed between frames to generate optical flow vectors for each pixel in a frame, which can be included in a dense optical flow map. In some examples, each optical flow map can include a 2D vector field, with each vector being a displacement vector showing the movement of points from a first frame to a second frame.

As noted above, an optical flow vector or optical flow map can be computed between frames of a sequence of frames. Two frames can include two directly adjacent frames that are consecutively captured frames or two frames that are a certain distance apart (e.g., within two frames of one another, within three frames of one another, or any other suitable distance) in a sequence of frames. In one illustrative example, a pixel I(x, y, t) in the frame x can move by a distance or displacement ($\Delta$x, $\Delta$y) in the frame y.

Figure 6:
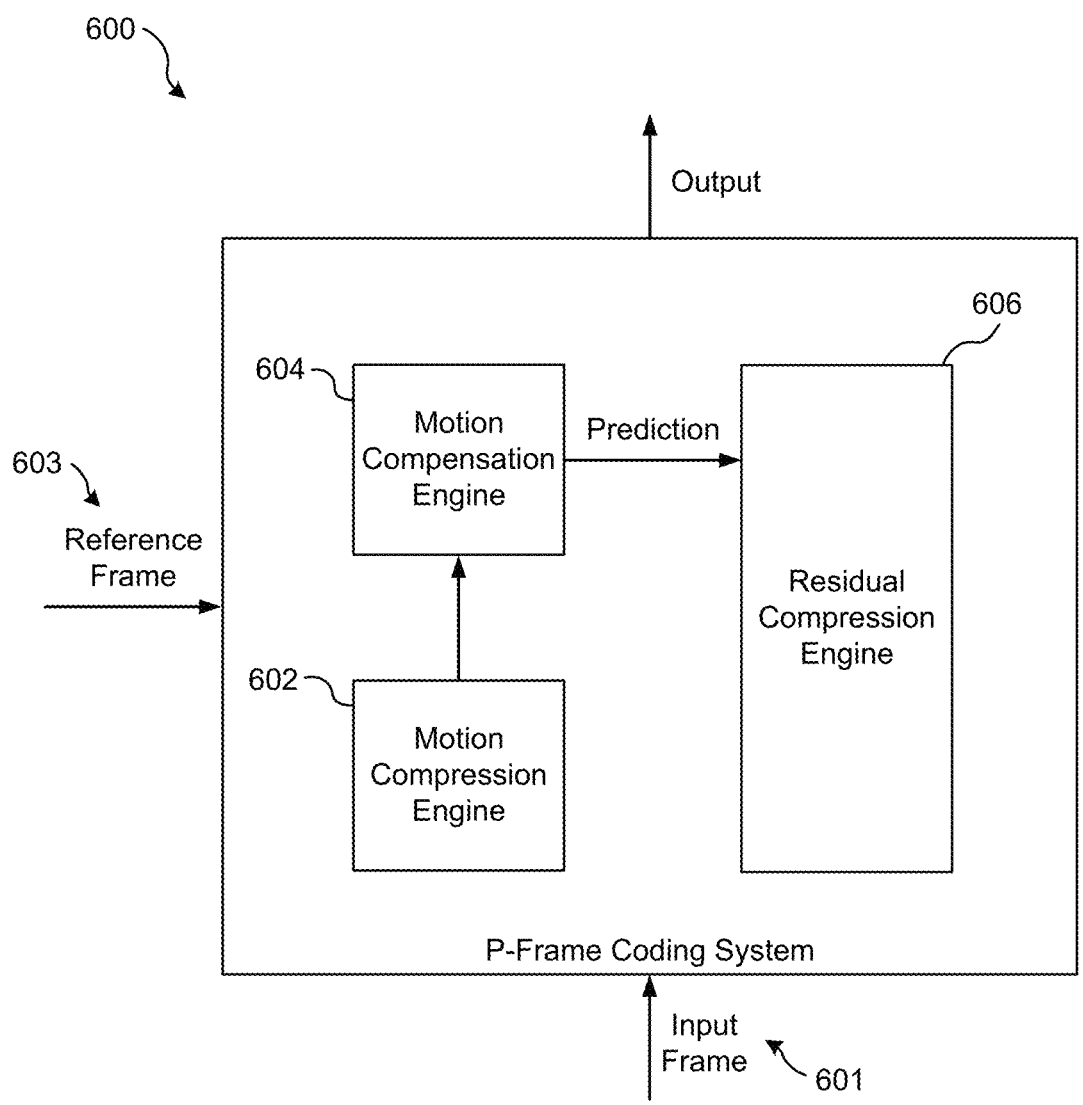
FIG. 6 is a diagram illustrating an example of a machine learning based P-frame coding system, in accordance with some examples.

In some cases, machine learning based P-frame coding systems (e.g., including one or more neural networks) can be used to perform uni-prediction. FIG. 6 is a diagram illustrating an example of a machine learning based P-frame coding system 600. The components of the P-frame coding system 600 includes a motion compression engine 602, a motion compensation engine 604, and a residual compression engine 606. The components of the P-frame coding system 600 can include one or more neural networks configured to perform unidirectional inter-prediction (uni-prediction) using the motion compression engine 602, the motion compensation engine 604, and the residual compression engine 606.

For example, the motion compression engine 602 can obtain an input frame 601 and a reference frame 603. The motion compression engine 602 can perform machine learning based motion compression to determine motion information between the input frame 601 and the reference frame 603. The motion compression engine 602 can provide the motion information to the motion compensation engine 604. The motion compensation engine 604 can also receive the reference frame 603 as input. The motion compensation engine 604 can use the motion information to modify the pixels of the reference frame and generate a prediction of the input frame 603. For instance, the motion compensation engine 604 can move the pixels of the reference frame according to motion vectors included in the motion. The residual compression engine 606 can generate a residual representing a difference between the prediction and the input frame 601. The residual can then be combined with the prediction to generate a reconstructed input frame. The reconstructed input frame can be output for storage, display, etc.

Figure 7:
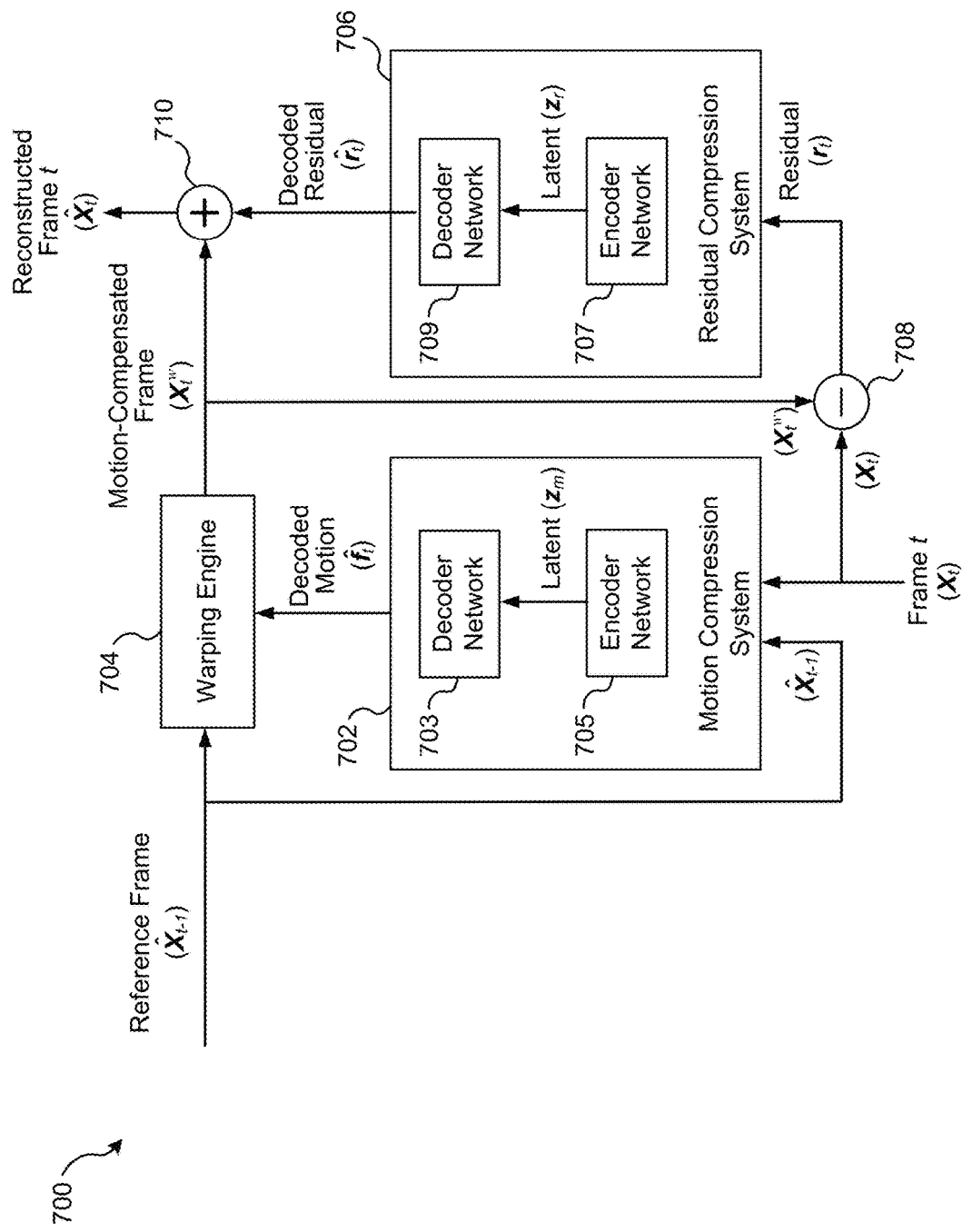
FIG. 7 is a diagram illustrating an example of a P-frame coding system that can be used to perform unidirectional coding and/or bidirectional coding, in accordance with some examples.

FIG. 7 is a diagram illustrating an example of a machine learning-based P-frame coding system 700. In some examples, the machine learning-based P-frame coding system 700 can be a neural network-based P-frame coding system (e.g., also referred to as a neural P-frame coding system and/or a neural P-frame codec (e.g., coder/decoder)). As illustrated, the example neural P-frame codec 700 includes a motion compression system 702, a warping engine 704, and a residual compression system 706. The motion compression system 702 and the residual compression system 706 can include any type of machine learning system (e.g., using one or more neural networks and/or other machine learning models, architectures, networks, etc.).

In some aspects, the motion compression system 702 can include one or more autoencoders. In one illustrative example, the encoder network 705 and the decoder network 703 of motion compression system 702 can be implemented as an autoencoder (e.g., also referred to as a "motion autoencoder" or "motion AE"). In some cases, the motion compression system 702 can be used to implement an optical flow-based motion estimation techniques, such as the example optical flow motion estimation technique 504 illustrated in FIG. 5, and the motion autoencoder can be implemented as an optical flow autoencoder (e.g., also referred to as a "flow autoencoder" or "flow AE"). In some aspects, the residual compression system 706 can include one or more autoencoders. In one illustrative example, the encoder network 707 and the decoder network 709 of residual compression system 706 can be implemented as an autoencoder (e.g., also referred to as a "residual autoencoder" or "residual AE"). While the example P-frame coding system 700 of FIG. 7 is shown to include certain components, one of ordinary skill will appreciate that the example P-frame coding system 700 can include fewer or more components than those shown in FIG. 7.

In one illustrative example, for a given time t, the neural P-frame coding system 700 can receive an input frame $X_t$ and a reference frame $\hat{X}_{t-1}$. In some aspects, the reference frame $\hat{X}_{t-1}$ can be a previously reconstructed frame (e.g., as indicated by the hat operator "$\hat{*}$") generated prior to time t (e.g., at time t−1). Input frame $X_t$ and reference frame $\hat{X}_{t-1}$ can be associated with or otherwise obtained from the same sequence of video data (e.g., as consecutive frames, etc.). For example, the input frame $X_t$ can be the current frame at time t, and the reference frame $\hat{X}_{t-1}$ can be a frame temporally or sequentially immediately prior to the input frame $X_t$. In some cases, the reference frame $\hat{X}_{t-1}$ may be received from a decoded picture buffer (DPB) of the example neural P-frame coding system 700. In some cases, the input frame $X_t$ can be a P-frame and the reference frame $\hat{X}_{t-1}$ can be an I-frame, a P-frame, or a B-frame. For example, the reference frame $\hat{X}_{t-1}$ can be previously reconstructed or generated by an I-frame coding system (e.g., which can be part of a device which includes the P-frame coding system 700 or a different device than that which includes the P-frame coding system 700), by the P-frame coding system 700 (or a P-frame coding system of a device other than that which includes the P-frame coding system 700), or by a B-frame coding system (e.g., which can be part of a device which includes the P-frame coding system 700 or a different device than that which includes the P-frame coding system 700).

As depicted in FIG. 7, motion compression system 702 (e.g., a motion autoencoder, optical flow autoencoder, etc.) receives as input reference frame $\hat{X}_{t-1}$ and the current (e.g., input) frame $X_t$. Motion compression system 702 can determine motion (e.g., represented by vectors, such as optical flow motion vectors) between pixels of reference frame $\hat{X}_{t-1}$ and pixels of input frame $X_t$. Motion compression system 702 can then encode, and in some cases decode, this determined motion as a decoded motion $\hat{f}_t$ for input frame $X_t$.

For example, an encoder network 705 of motion compression system 702 can be used to determine motion (e.g., motion information) between current frame $X_t$ and reference frame $\hat{X}_{t-1}$. In some aspects, encoder network 705 can encode the determined motion information into a latent representation (e.g., denoted as latent $z_m$). For example, in some cases encoder network 705 can map the determined motion information to a latent code, which can be used as the latent $z_m$. Encoder network 705 can additionally, or alternatively, convert the latent $z_m$ into a bitstream by performing entropy coding on the latent code associated with $z_m$. In some examples, encoder network 705 can quantize the latent $z_m$ (e.g., prior to entropy coding being performed on the latent code). The quantized latent can include a quantized representation of the latent $z_m$. In some cases, the latent $z_m$ can include neural network data (e.g., a neural network node's activation map or feature map) that represents one or more quantized codes.

In some aspects, encoder network 705 can store the latent $z_m$, send the latent $z_m$ to a decoder network 703 included in motion compression system 702, and/or can send the latent $z_m$ to another device or system that can decode the latent $z_m$. Upon receiving the latent $z_m$, decoder network 703 can decode (e.g., inverse entropy code, dequantize, and/or reconstruct) the latent $z_m$ to generate decoded motion information $\hat{f}_t$ between pixels of reference frame $\hat{X}_{t-1}$ and pixels of input frame $X_t$. For example, decoder network 703 can decode the latent $z_m$ to generate the decoded motion information as an optical flow map $\hat{f}_t$ that includes one or more motion vectors mapping some (or all) of the pixels included in reference frame $\hat{X}_{t-1}$ to pixels of input frame $X_t$. Encoder network 705 and decoder network 703 can be trained and optimized using training data (e.g., training images or frames) and one or more loss functions, as will be described in greater depth below.

In one illustrative example, encoder network 705 and decoder network 703 can be included in a motion compression autoencoder, such as an optical flow autoencoder. The optical flow autoencoder can include one or more components for quantizing the latent $z_m$ (e.g., generated as output by encoder network 705 of the optical flow autoencoder) and converting the quantized latent into a bitstream. The bitstream generated from the quantized latent can be provided as input to decoder 703 of the optical flow autoencoder.

In some examples, decoded motion information $\hat{f}_t$ can include optical flow data (e.g., an optical flow map including one or more motion vectors), dynamic convolution data (e.g., a matrix or kernel for data convolution), or block-based motion data (e.g., a motion vector for each block). In one illustrative example, the decoded motion information $\hat{f}_t$ can include an optical flow map (e.g., and may also be referred to as the "optical flow map $\hat{f}_t$"). In some cases, as described previously, an optical flow map $\hat{f}_t$ can include a motion vector for each pixel of input frame $X_t$ (e.g., a first motion vector for a first pixel, a second motion vector for a second pixel, and so on). The motion vectors can represent the motion information determined (e.g., by encoder network 705) for the pixels in current frame $X_t$ relative to corresponding pixels in reference frame $\hat{X}_{t-1}$.

The warping engine 704 of neural P-frame coding system 700 can obtain the optical flow map $\hat{f}_t$ generated as output by motion compression system 702 (e.g., generated as output by decoder network 703/the optical flow autoencoder described above). For example, warping engine 704 can retrieve optical flow map $\hat{f}_t$ from storage or can receive optical flow map $\hat{f}_t$ from motion compression system 702 directly. Warping engine 704 can use optical flow map $\hat{f}_t$ to warp (e.g., by performing motion compensation) the pixels of reference frame $\hat{X}_{t-1}$, resulting in the generation of a warped frame $X_t^w$. In some aspects, warped frame $X_t^w$ can also be referred to as a motion compensated frame $X_t^w$ (e.g., generated by warping the pixels of reference frame $\hat{X}_{t-1}$ based on the corresponding motion vectors included in optical flow map $\hat{f}_t$). For example, warping engine 704 can generate motion compensated frame $X_t^w$ by moving the pixels of reference frame $\hat{X}_{t-1}$ to new locations based on the motion vectors (and/or other motion information) included in optical flow map $\hat{f}_t$.

As noted above, to generate warped frame $X_t^w$, neural P-frame coding system 700 can perform motion compensation by obtaining an optical flow $\hat{f}_t$ between input frame $X_t$ and reference frame $\hat{X}_{t-1}$, and subsequently generating the motion compensated frame $X_t^w$ by warping reference frame $\hat{X}_{t-1}$ using the optical flow map $\hat{f}_t$. However, in some cases, the warped frame (e.g., motion-compensated frame $X_t^w$)

generated based on optical flow map $\hat{f}_t$ may not be accurate enough to represent input frame $X_t$ as a reconstructed frame $\hat{X}_t$. For example, there may be one or more occluded areas in a scene depicted by input frame $X_t$, excessive lighting, lack of lighting, and/or other effects that results in the motion-compensated frame $X_t^w$ not being accurate enough to for use as a reconstructed input frame $\hat{X}_t$.

Residual compression system 706 can be used to correct or otherwise refine the warping associated with motion-compensated frame $X_t^w$. For example, residual compression system 706 can generate one or more residuals that neural P-frame coding system 700 can subsequently combine with the warped, motion-compensated frame $X_t^w$ in order to thereby generate a more accurate reconstructed input frame $\hat{X}_t$ (e.g., a reconstructed input frame $\hat{X}_t$ that more accurately represents the underlying input frame $X_t$). In one illustrative example, as depicted in FIG. 7, neural P-frame coding system 700 can determine a residual $r_t$ by subtracting the warped (e.g., motion-compensated) frame $X_t^w$ from input frame $X_t$ (e.g., determined using a subtraction operation 708). For example, after the motion-compensated frame $X_t^w$ is determined by warping engine 704, P-frame coding system 700 can determine the residual $r_t$ by determining the difference (e.g., using subtraction operation 708) between motion-compensated frame $X_t^w$ and input frame $X_t$.

In some aspects, an encoder network 707 of residual compression system 706 can encode the residual $r_t$ into a latent $z_r$, where the latent $z_r$ represents the residual $r_t$. For example, encoder network 707 can map the residual $r_t$ to a latent code, which can be used as the latent $z_r$. In some cases, encoder network 707 can convert the latent $z_r$ into a bitstream by performing entropy coding on the latent code. In some examples, encoder network 707 can additionally, or alternatively, quantize the latent $z_r$ (e.g., before entropy coding is performed). The quantized latent $z_r$ can include a quantized representation of the residual $r_t$. In some cases, the latent $z_r$ can include neural network data (e.g., a neural network node's activation map or feature map) that represents one or more quantized codes. In some aspects, encoder network 707 can store the latent $z_r$, transmit or otherwise provide the latent $z_r$ to a decoder network 709 of residual compression system 706, and/or can send the latent $z_r$ to another device or system that can decode the latent $z_r$. Upon receiving the latent $z_r$, decoder network 709 can decode the latent $z_r$ (e.g., inverse entropy code, dequantize, and/or reconstruct) to generate a (e.g., decoded) residual $\hat{r}_t$. In some examples, encoder network 707 and decoder network 709 can be trained and optimized using training data (e.g., training images or frames) and one or more loss functions, as described below.

In one illustrative example, encoder network 707 and decoder network 709 can be included in a residual compression autoencoder. The residual autoencoder can include one or more components for quantizing the latent $z_r$ (e.g., where the latent $z_r$ is generated as output by encoder network 707 of the residual autoencoder) and converting the quantized latent into a bitstream. The bitstream generated from the quantized latent $z_r$ can be provided as input to decoder 709 of the residual autoencoder.

The decoded residual $\hat{r}_t$ (e.g., generated by decoder network 709 and/or a residual autoencoder used to implement residual compression system 706) can be used with the motion-compensated frame $X_t^w$ (e.g., generated by warping engine 704 using the optical flow map $\hat{f}_t$ generated by decoder network 703 and/or an optical flow autoencoder used to implement motion compression system 702) to generate a reconstructed input frame $\hat{X}_t$ representing the input frame $X_t$ at time t.

For example, neural P-frame coding system 700 can add (e.g., using addition operation 710) or otherwise combine the decoded residual $\hat{r}_t$ and the motion-compensated frame $X_t^w$ to generate the reconstructed input frame $\hat{X}_t$. In some cases, decoder network 709 of residual compression system 706 can add the decoded residual $\hat{r}_t$ to the motion-compensated frame prediction $X_t^w$. In some examples, reconstructed input frame $\hat{X}_t$ may also be referred to as a decoded frame and/or a reconstructed current frame. The reconstructed current frame $\hat{X}_t$ can be output for storage (e.g., in a decoded picture buffer (DPB) or other storage), transmission, display, for further processing (e.g., as a reference frame in further inter-predictions, for post-processing, etc.), and/or for any other use.

In one illustrative example, P-frame coding system 700 can transmit the latent data representing an optical flow map or other motion information (e.g., the latent $z_m$) and the latent data representing the residual information (e.g., the latent $z_r$) in one or more bitstreams to another device for decoding. In some cases, the other device can include a video decoder configured to decode the latents $z_m$ and $z_r$. In one illustrative example, the other device can include a video decoder implementing one or more portions of P-frame coding system 700, motion compression system 702 (e.g., an optical flow autoencoder), and/or residual compression system 706 (e.g., a residual autoencoder), as described above.

The other device or video decoder can decode the optical flow map $\hat{f}_t$ and/or other motion information using the latent $z_m$ generated as output by the decoder network 703 included in motion compression system 702 (e.g., generated as output by an optical flow autoencoder that includes decoder network 703). The other device or video decoder can additionally decode the residual $\hat{r}_t$ using the latent $z_r$ generated as output by the decoder network 709 included in residual compression system 706 (e.g., generated as output by a residual autoencoder that includes decoder network 709). The other device or video decoder can subsequently use the optical flow map $\hat{f}_t$ and the residual $\hat{r}_t$ to generate the decoded (e.g., reconstructed) input frame $\hat{X}_t$.

For example, when the video decoder implements a same or similar architecture to that of the P-frame coding system 700 described above, the video decoder can include a warping engine (e.g., the same as or similar to warping engine 704) that receives as input the decoded optical flow map $\hat{f}_t$ and the reference frame $\hat{X}_{t-1}$. The video decoder warping engine can warp reference frame $\hat{X}_{t-1}$ based on motion vectors and/or other motion information determined for some (or all) of the pixels of reference frame $\hat{X}_{t-1}$, based on the decoded optical flow map $\hat{f}_t$. The video decoder warping engine can output a motion-compensated frame $X_t^w$ (e.g., as described above with respect to the output of warping engine 704). The video decoder can subsequently add or otherwise combine the decoded residual $\hat{r}_t$ and the motion-compensated frame $X_t^w$ to generate the decoded (e.g., reconstructed) input frame $\hat{X}_t$ (e.g., as described above with respect to the output of addition operation 710).

In some examples, motion compression system 702 and/or residual compression system 706 can be trained and/or optimized using training data and one or more loss functions. In some cases, motion compression system 702 and/or residual compression system 706 can be trained in an end-to-end manner (e.g., where all neural network components are trained during the same training process). As mentioned previously, in some examples motion compression system 702 can be implemented as an optical flow autoencoder including encoder network 705 and decoder network 703; and residual compression system 706 can be implemented as a residual autoencoder including encoder network 707 and decoder network 709. In some aspects, the training data can include a plurality of training images and/or training frames. In some cases, a loss function (e.g., Loss) can be used to perform training, based on motion compression system 702 and/or residual compression system 706 processing the training images or frames.

In one example, the loss function (e.g., Loss) can be given as Loss=D+βR, where D is a distortion between a given frame (e.g., such as input frame $X_t$) and its corresponding reconstructed frame (e.g., $\hat{X}_t$). For example, the distortion D can be determined as $D(X_t, \hat{X}_t)$. β is a hyperparameter that can be used to control a bitrate (e.g., bits per pixel), and R is a quantity of bits used to convert the residual (e.g., residual $r_t$) to a compressed bitstream (e.g., latent $z_r$). In some examples, the distortion D can be calculated based on one or more of a peak signal-to-noise ratio (PSNR), a structural similarity index measure (SSIM), a multiscale SSIM (MS-SSIM), and/or the like. In some aspects, using one or more training data sets and one or more loss functions, parameters (e.g., weights, biases, etc.) of motion compression system 702 and/or residual compression system 706 can be tuned until a desired video coding result is achieved by example neural P-frame coding system 700.

In some aspects, a neural video encoder (e.g., such as the example neural P-frame coding system 700 illustrated in FIG. 7) that uses optical flow to model or obtain motion between frames of video data may generate an optical flow map for each inter-frame that is encoded. For example, the neural P-frame coding system 700 may generate an optical flow map $\hat{f}_t$ for each inter-frame $X_t$ that is encoded by neural P-frame coding system 700. For each encoded inter-frame, a neural video encoder must transmit the corresponding optical flow map $\hat{f}_t$ or a representation of the optical flow map $\hat{f}_t$ (e.g., the latent representation $z_m$) to a neural video decoder. In some cases, the neural video encoder and the neural video decoder may be the same or similar and/or may each implement some or all of the example neural P-frame coding system 700). A neural video encoder also generates a residual $r_t$ for each inter-frame that is encoded. In addition to transmitting (e.g., to a neural video decoder) the corresponding optical flow map $\hat{f}_t$ determined for each inter-frame $X_t$, the neural video encoder may also transmit the corresponding residual $r_t$ (or the latent representation $z_r$ of the residual $r_t$).

Transmitting both the optical flow map $\hat{f}_t$ and the latent representation $r_t$ (or the latent representations $z_m$ and $z_r$, respectively) determined for each encoded inter-frame $X_t$ can be an inefficient process that does not make optimal use of the available bits or transmission bandwidth between the neural video encoder and the neural video decoder. For example, existing P-frame encoders, decoders, codecs, coding systems, etc., do not capture or otherwise utilize second-order temporal redundancies between the individual optical flow maps $\hat{f}_t$ and/or residuals $r_t$ that are encoded for successive frames of video data. For example, for two inter-frames $X_t$ and $X_{t-1}$, a neural video encoder may generate the optical flow maps $\hat{f}_t$ and $\hat{f}_{t-1}$ and the residuals $r_t$ and $r_{t-1}$, respectively. The optical flow maps $\hat{f}_t$ and $\hat{f}_{t-1}$ and/or the residuals $r_t$ and $r_{t-1}$ may exhibit a high degree of similarity between time steps t and t−1, particularly if there is little motion or change in the scene between frames $X_t$ and $X_{t-1}$. However, despite the temporal redundancy between the optical flow maps and/or residuals generated by the neural video encoder for frames $X_t$ and $X_{t-1}$, existing neural video encoders may transmit the complete information for each of optical flow maps $\hat{f}_t$ and $\hat{f}_{t-1}$ and each of residuals $r_t$ and $r_{t-1}$ for decoding at a neural video decoder. There is a need for systems and techniques to more efficiently perform neural P-frame encoding and decoding, for example by encoding inter-frames based on the second-order temporal redundancies between optical flow maps and residuals generated for the encoded inter-frames.

Figure 8:
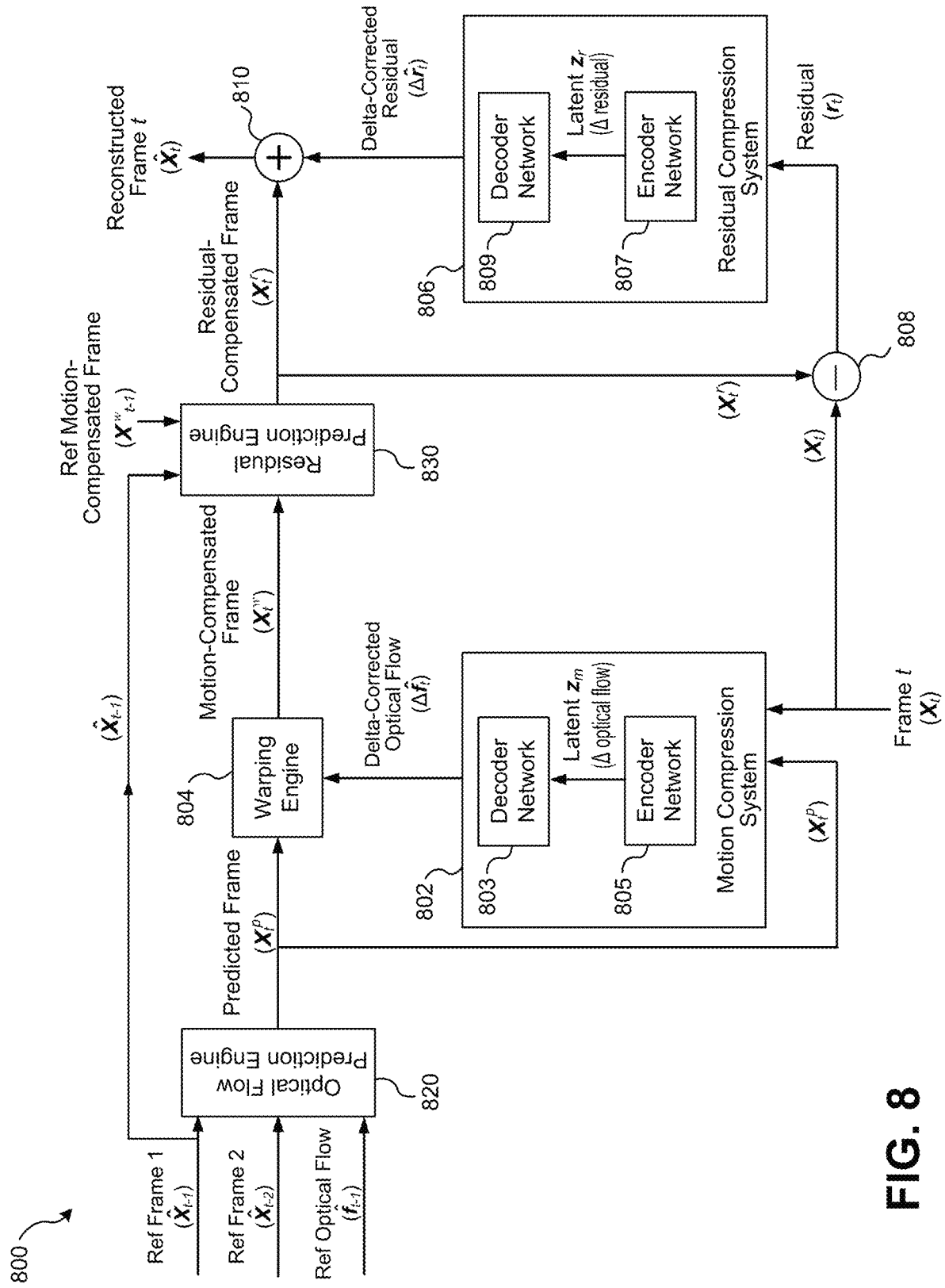
FIG. 8 is a diagram illustrating an example of a machine learning-based P-frame coding system including an optical flow prediction engine and a residual prediction engine, in accordance with some examples.

FIG. 8 is a diagram illustrating an example of a machine learning-based P-frame coding system 800. In one illustrative example, the machine learning-based P-frame coding system 800 can be implemented using one or more neural networks and/or autoencoders, as will be described in greater depth below. In some aspects, the machine learning-based P-frame coding system 800 can be the same as or similar to the example neural P-frame coding system 700 described above with respect to FIG. 7. For example, the machine learning-based P-frame coding system 800 can be the same as or similar to example neural P-frame coding system 700, with the addition of an optical flow prediction engine 820 and a residual prediction engine 830.

In one illustrative example, optical flow prediction engine 820 and residual prediction engine 830 can be used to encode inter-frames of video data (e.g., a current or input frame $X_t$) based on second-order temporal redundancies that may be included in optical flow maps and/or residual maps generated for successive inter-frames $X_t, X_{t-1}, X_{t-2}, \ldots$, of the video data. As mentioned previously, these second-order temporal redundancies may be present based on a relatively high degree of similarity between the optical flow maps and/or residual maps determined for successive inter-frames $X_n$. For example, successive optical flow maps and/or residual map may include temporal redundancies because the motion that is present between successive frames $X_t$ and $X_{t-1}$ (e.g., successive inter-frames) of natural video data is often smooth or otherwise relatively small/minor.

In some aspects, the systems and techniques can encode inter-frames of video data based at least in part on predicting an optical flow map (e.g., a predicted optical flow map $f_t^p$, described below with respect to FIG. 9A) for the current frame $X_t$ and predicting a residual map (e.g., a predicted residual map $r_t^p$, described below with respect to FIG. 9B) for the current frame $X_t$. In one illustrative example, optical flow prediction engine 820 can generate the predicted optical flow map $f_t^p$ based on one or more previously reconstructed (e.g., previously decoded) inter-frames, $\hat{X}_{t-1}$ and $\hat{X}_{t-2}$, and a previous optical flow map $\hat{f}_{t-1}$. Optical flow prediction engine 820 and the predicted optical flow map $f_t^p$ will be described in greater depth below with respect to the example optical flow prediction engine 920 illustrated in FIG. 9A. In some aspects, the same predicted optical flow map $f_t^p$ can be generated independently by a neural video encoder and a neural video decoder (e.g., each implementing some or all of the example neural P-frame coding system 800), because the one or more previously decoded inter-frames, $\hat{X}_{t-1}$ and $\hat{X}_{t-2}$, and the previous optical flow map, $\hat{f}_{t-1}$, are already known to both the neural video encoder and the neural video decoder.

Similarly, residual prediction engine 830 can generate the predicted residual map $r_t^p$ based on a current motion compensated frame $X_t^w$, a previously generated (e.g., reference) motion compensated frame $X_{t-1}^w$ and the previously reconstructed (e.g., previously decoded) inter-frame $\hat{X}_{t-1}$. Residual prediction engine 830 and the predicted residual map $r_t^p$ will be described in greater depth below with respect to the example residual prediction engine 930 illustrated in FIG. 9B. As described above with respect to the predicted optical flow map $f_t^p$, in some examples the same predicted residual map $r_t^p$ can be generated independently by a neural video encoder and a neural video decoder (e.g., each implementing some or all of the example neural P-frame coding system 800), because the motion compensated frames, $X_t^w$ and $X_{t-1}^w$, and the previously decoded inter-frame, $\hat{X}_{t-1}$, are already known to both the neural video encoder and the neural video decoder.

In one illustrative example, a neural video encoder implementing the example neural P-frame coding system 800 can encode a current inter-frame $X_t$ based on generating a predicted frame $X_t^p$ using the predicted optical flow map $f_t^p$, and correcting the predicted optical flow map $f_t^p$ by generating a delta-corrected optical flow $\Delta \hat{f}_t$ using a motion compression system 802. As will be described in greater depth below, the motion compression system 802 can generate the delta-corrected optical flow $\Delta \hat{f}_t$ using an encoder network 805 and a decoder network 803. In one illustrative example, the encoder network 805 and the decoder network 803 can be included in an optical flow autoencoder (e.g., motion compression system 802 can be implemented as an optical flow autoencoder). Because the neural video encoder and a corresponding neural video decoder (e.g., both implementing some or all of the neural P-frame coding system 800) can both independently generate the predicted frame $X_t^p$, the neural video encoder can transmit the delta-corrected optical flow $\Delta \hat{f}_t$ to the neural video decoder (e.g., rather than needing to transmit a complete optical flow map $\hat{f}_t$), and the neural video decoder can perform local correction of the predicted frame $X_t^p$ based on receiving the delta-corrected optical flow $\Delta \hat{f}_t$. The output associated with or otherwise generated based on correcting the predicted frame $X_t^p$ (e.g., using the delta-corrected optical flow $\Delta \hat{f}_t$) can be the delta-corrected and motion-compensated frame $X_t^w$.

The neural video encoder implementing the example neural P-frame coding system 800 can additionally generate a residual-compensated frame $X_t^r$ (e.g., $X_t^r = X_t^w + r_t^p$) using the predicted residual map $r_t^p$ and the motion-compensated frame $X_t^w$. The residual-compensated frame $X_t^r$ can be corrected by generating a delta-corrected residual $\Delta \hat{r}_t$. As will be described in greater depth below, the residual compression system 806 can generate the delta-corrected residual $\Delta \hat{r}_t$ using an encoder network 807 and a decoder network 809. In one illustrative example, the encoder network 807 and the decoder network 809 can be included in a residual autoencoder (e.g., residual compression system 806 can be implemented as a residual autoencoder). Because the neural video encoder and the corresponding neural video decoder (e.g., both implementing some or all of the neural P-frame coding system 800) can both generate the residual-compensated frame $X_t^r$, the neural video encoder can transmit the delta-corrected residual $\Delta \hat{r}_t$ to the neural video decoder (e.g., rather than needing to transmit a complete residual map $\hat{r}_t$), and the neural video decoder can perform local correction of the residual-compensated frame $X_t^r$ based on receiving the delta-corrected residual $\Delta \hat{r}_t$.

Based on correcting the locally generated initial prediction frame $X_t^p$ (e.g., based on receiving the delta-corrected optical flow $\Delta \hat{f}_t$ from the neural video encoder), and correcting the locally generated residual-compensated frame $X_t^r$ (e.g., based on receiving the delta-corrected residual $\Delta \hat{r}_t$ from the neural video encoder), the neural video decoder can generate the reconstructed frame $\hat{X}_t$. For example, the neural video decoder can generate the reconstructed frame $\hat{X}_t$ based on adding or otherwise combining the residual-compensated frame $X_t^r$ and the delta-corrected residual $\Delta \hat{r}_t$ (e.g., $\hat{X}_t = X_t^r + \Delta \hat{r}_t = (X_t^w + r_t^p) + \Delta \hat{r}_t$).

Figure 9A:
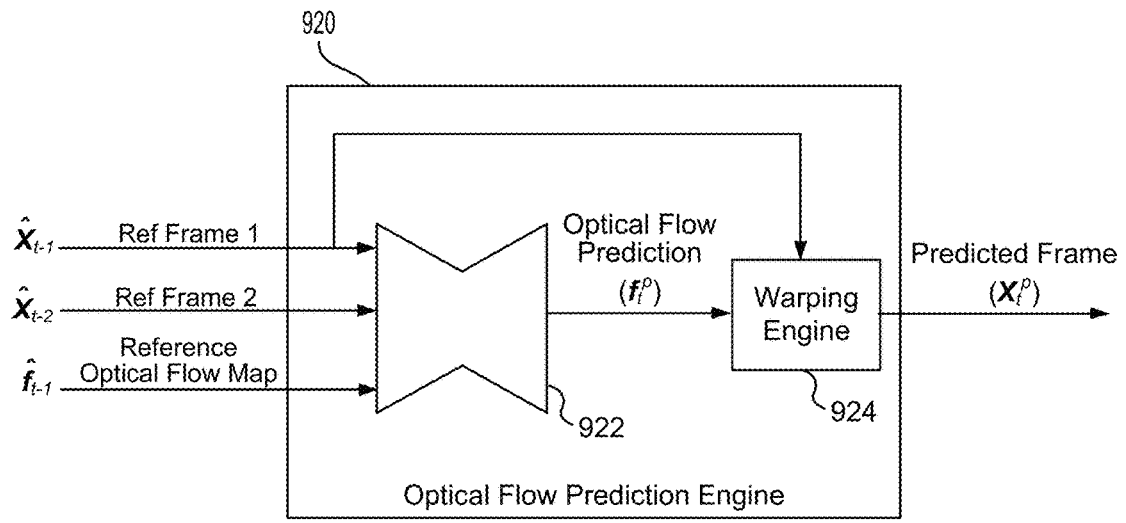
FIG. 9A is a diagram illustrating an example optical flow prediction engine, in accordance with some examples.

FIG. 9A is a diagram illustrating an example optical flow prediction engine 920, which can be the same as or similar to the optical flow prediction engine 820 illustrated in FIG. 8. FIG. 9B is a diagram illustrating an example residual prediction engine 930, which can be the same as or similar to the residual prediction engine 830 illustrated in FIG. 8. The description below makes reference to FIG. 8 and FIGS. 9A, 9B; optical flow prediction engine 820 and optical flow prediction engine 920 are referred to interchangeably, and residual prediction engine 830 and residual prediction engine 930 are likewise referred to interchangeably.

As mentioned previously, a neural video encoder (and/or a corresponding neural video decoder) can generate a predicted optical flow map $f_t^p$ using the optical flow prediction engine 820/920. For example, as illustrated in greater detail in FIG. 9A, the predicted optical flow map $f_t^p$ can be generated based on providing a first reference frame (e.g., a first previously decoded frame) $\hat{X}_{t-1}$, a second reference frame (e.g., a second previously decoded frame) $\hat{X}_{t-2}$, and a reference optical flow map $\hat{f}_{t-1}$ as inputs to an autoencoder 922 included in the optical flow prediction engine 920. In some aspects, the reference optical flow map $\hat{f}_{t-1}$ is the optical flow map previously determined between the first reference frame $\hat{X}_{t-1}$ and the second reference frame $\hat{X}_{t-2}$.

In one illustrative example, the three inputs to optical flow prediction engine 920 (e.g., $\hat{X}_{t-1}$, $\hat{X}_{t-2}$, $\hat{f}_{t-1}$) can be provided as input to an encoder network 1010 included in autoencoder 922. A coded output (e.g., latent) 1015 generated by encoder network 1010 can be provided as input to a decoder network 1020 that is also included in autoencoder 922. As illustrated, the output of decoder network 1020 included in autoencoder 922 (e.g., the output of autoencoder 922) can be the predicted optical flow map $f_t^p$.

The optical flow prediction engine 820/920 can further include a warping engine 924. Warping engine 924 can receive as input the predicted optical flow map $f_t^p$ generated by the autoencoder 922 and the first reference frame $\hat{X}_{t-1}$. Subsequently, warping engine 924 can generate the predicted frame $X_t^p$ by warping the first reference frame $\hat{X}_{t-1}$ using the predicted optical flow map $f_t^p$.

The predicted frame $X_t^p$ can subsequently be used to generate the delta-corrected optical flow $\Delta \hat{f}_t$. For example, a neural video encoder implementing the example neural P-frame coding system 800 can provide the predicted frame $X_t^p$ generated by the optical flow prediction engine 820 as an input to a motion compression system 802. In one illustrative example, the motion compression system 802 can be implemented as an autoencoder including an encoder network 805 and a decoder network 803 (e.g., motion compression system 802 can be implemented as an optical flow autoencoder). Motion compression system 802 can additionally receive as input the current inter-frame $X_t$, which in the context of a neural video encoder is the inter-frame currently being encoded.

Motion compression system 802 can be trained to generate or otherwise determine an optical flow map between two inputs, for example as described above with respect to the motion compression system 702 illustrated in FIG. 7. In some aspects, encoder network 805 can receive as input the predicted frame $X_t^p$ generated by the optical flow prediction engine 820 and the currently encoded inter-frame $X_t$. Based on these inputs, encoder network 805 can generate as output a latent representation $z_m$ of an optical flow map determined between the predicted frame $X_t^p$ and the currently encoded inter-frame $X_t$. Because the predicted frame $X_t^p$ is generated by warping the first reference frame $\hat{X}_{t-1}$ using the predicted optical flow map $f_t^p$, encoder network 805 generates the latent optical flow map representation $z_m$ as a delta (e.g., difference) between the predicted optical flow map $f_t^p$ and the actual (e.g., underlying or ground-truth) optical flow map between predicted frame $X_t^p$ and currently encoded inter-frame $X_t$. As depicted in FIG. 8, the latent optical flow map representation $z_m$ generated by encoder network 805 may also be referred to as a "Δ optical flow."

The Δ optical flow can be provided as input to decoder network 803 of motion compression system/optical flow autoencoder 802, which generates as output a delta-corrected optical flow $\Delta\hat{f}_t$. For example, decoder network 803 can generate the delta-corrected optical flow map $\Delta\hat{f}_t$ based on the latent representation $z_m$ generated by encoder network 805.

The delta-corrected optical flow map $\Delta\hat{f}_t$ can be provided by motion compression system/optical flow autoencoder 802 as an input to a warping engine 804. Warping engine 804 can additionally receive as input the predicted frame $X_t^p$ (e.g., generated by the optical flow prediction engine 820 by warping the first reference frame $\hat{X}_{t-1}$ based on the optical flow prediction engine 820's predicted optical flow map $f_t^p$). Warping engine 804 may subsequently correct the predicted optical flow map $f_t^p$ represented in predicted frame $X_t^p$, by applying the delta-corrected optical flow map $\Delta\hat{f}_t$ to the predicted frame $X_t^p$. In one illustrative example, warping engine 804 can warp the predicted frame $X_t^p$ based on the motion information included in the delta-corrected optical flow map $\Delta\hat{f}_t$, generating as output the delta-corrected motion-compensated frame $X_t^w$.

Figure 9B:
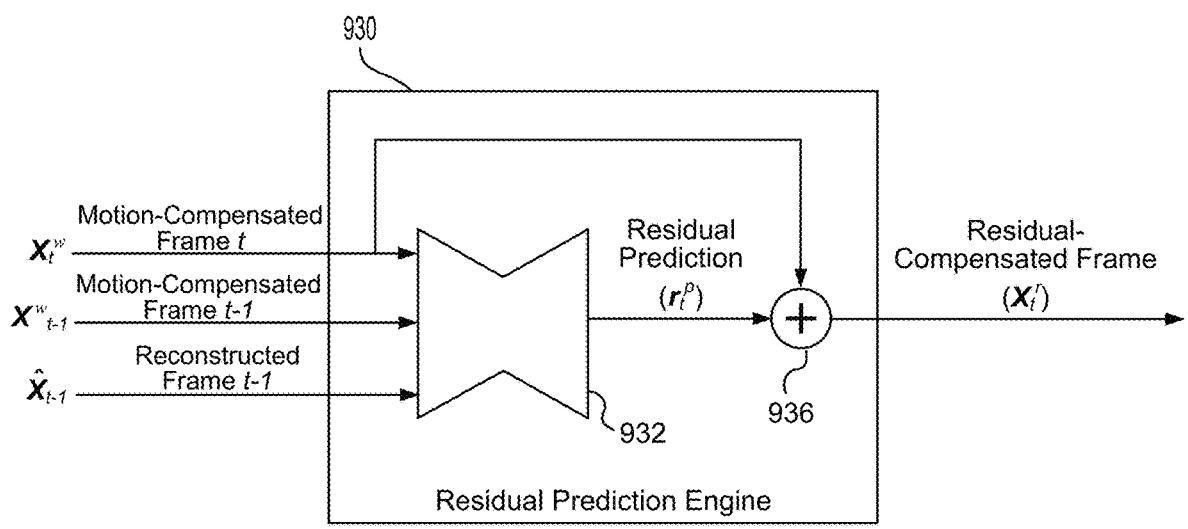
FIG. 9B is a diagram illustrating an example residual prediction engine, in accordance with some examples.
Figure 10:
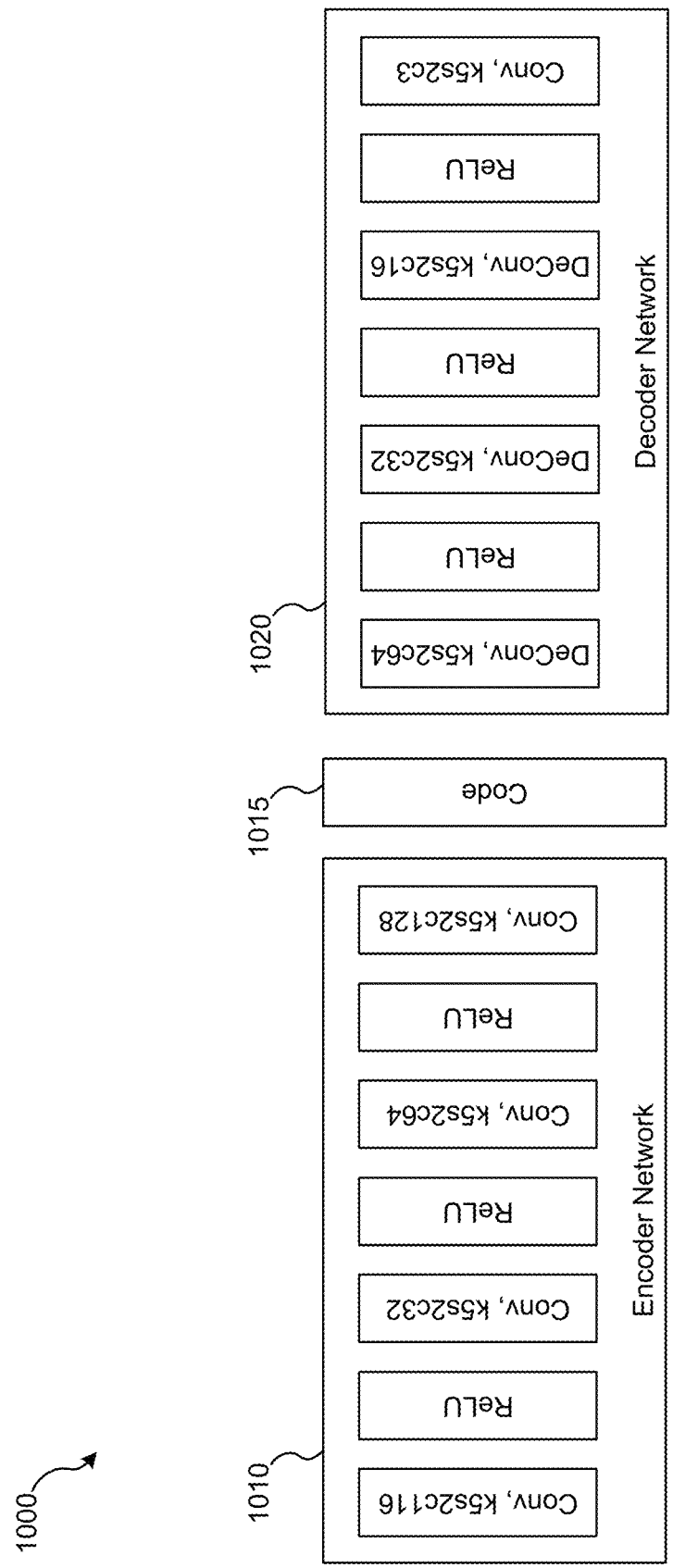
FIG. 10 is a diagram illustrating an example neural network-based architecture that can be used to implement an autoencoder, in accordance with some examples.

The delta-corrected motion-compensated frame $X_t^w$ can be provided as input to residual prediction engine 830, which in some examples can be the same as or similar to the residual prediction engine 930 illustrated in FIG. 9B. In one illustrative example, residual prediction engine 830/930 can include an autoencoder 932, which receives as input the delta-corrected motion-compensated frame $X_t^w$, the previous motion-compensated frame $X_{t-1}^w$, and the first reference frame $\hat{X}_{t-1}$. In some aspects, autoencoder 932 can be implemented using the example neural network-based hourglass architecture 1000 depicted in FIG. 10. In one illustrative example, the three inputs to residual prediction engine 930 can be provided as input to an encoder network 1010 included in autoencoder 932. A coded output (e.g., latent) 1015 generated by encoder network 1010 can be provided as input to a decoder network 1020 that is also included in autoencoder 932. As illustrated, the output of decoder network 1020 included in autoencoder 932 (e.g., the output of autoencoder 932) can be the predicted residual map $r_t^p$.

The residual prediction engine 830/930 can further include an addition operation 936, which may receive as input the predicted residual map $r_t^p$ generated by the autoencoder 932 and the delta-corrected motion-compensated frame $X_t^w$ generated by the warping engine 804 (e.g., as described above). Subsequently, the addition operation 936 can generate the residual-compensated frame $X_t^r$ by adding or otherwise combining the delta-corrected motion-compensated frame $X_t^w$ and the predicted residual map $r_t^p$.

The residual-compensated frame $X_t^r$ can subsequently be used to generate the delta-corrected residual $\Delta\hat{r}_t$. For example, a neural video encoder implementing the example neural P-frame coding system 800 can provide the residual-compensated frame $X_t^r$ generated by the residual prediction engine 830 as an input to a subtraction operation 808. As illustrated, the subtraction operation 808 can also receive as input the currently encoded inter-frame $X_t$ and generate as output a residual $r_t$. For example, the residual $r_t$ can be determined as a difference between the currently encoded inter-frame $X_t$ and the residual-compensated frame $X_t^r$. The residual $r_t$ can subsequently be provided as input to a residual compression system 806. In one illustrative example, the residual compression system 806 can be implemented as an autoencoder including an encoder network 807 and a decoder network 809 (e.g., residual compression system 806 can be implemented as a residual autoencoder).

Residual compression system 806 can be trained to generate or otherwise determine a residual map between two inputs, for example as described above with respect to the residual compression system 706 illustrated in FIG. 7. In some aspects, encoder network 807 can receive as input the residual $r_t$ determined between the currently encoded inter-frame $X_t$ and the residual-compensated frame $X_t^r$. Based on the input of residual $r_t$, encoder network 807 can generate as output a latent representation $z_r$ of an residual map determined between the residual-compensated frame $X_t^r$ and the currently encoded inter-frame $X_t$.

Because the residual-compensated frame $X_t^r$ includes the predicted residual map $r_t^p$, encoder network 807 generates the latent residual representation $z_r$ as a delta (e.g., difference) between the predicted residual map $r_t^p$ and the actual (e.g., underlying) residual between the delta-corrected motion-compensated frame $X_t^w$ and the currently encoded inter-frame $X_t$. As depicted in FIG. 8, the latent residual representation $z_r$ generated by encoder network 807 may also be referred to as a "Δ residual."

The Δ residual can be provided as input to decoder network 809 of residual compression system/residual autoencoder 806, which generates as output a delta-corrected residual $\Delta\hat{r}_t$. For example, decoder network 809 can generate the delta-corrected residual $\Delta\hat{r}_t$ based on the latent representation $z_r$ generated by encoder network 807.

The delta-corrected residual $\Delta\hat{r}_t$ can be provided by residual compression system/residual autoencoder 806 as an input to an addition operation 810. Addition operation 810 can additionally receive as input the residual-compensated frame $X_t^r$ (e.g., generated by the residual prediction engine 830 by adding or combining the delta-corrected motion-compensated frame $X_t^w$ with the residual prediction engine 830's predicted residual map $r_t^p$). Addition operation 810 may subsequently correct the predicted residual map $r_t^p$ represented in residual-compensated frame $X_t^r$ by applying the delta-corrected residual map $\Delta\hat{r}_t$ to the residual-compensated frame $X_t^r$. In one illustrative example, addition operation 810 can add the residual-compensated frame $X_t^r$ and the delta residual correction information associated with the delta-corrected residual map $\Delta\hat{r}_t$, generating as output the reconstructed inter-frame $\hat{X}_t$.

In one illustrative example, a neural video encoder can implement the example neural P-frame coding system architecture 800 in order to generate the Δ optical flow correction (e.g., using encoder network 805 of motion compression system/optical flow autoencoder 802) and the Δ residual correction (e.g., using encoder network 807 of residual compression system/residual autoencoder 806). The neural video encoder can generate and transmit encoded video data of the currently encoded inter-frame $X_t$ to a corresponding neural video decoder, wherein the encoded video data includes the Δ optical flow correction and the Δ residual correction. For example, the encoded video data can include the latent $z_m$ associated with the Δ optical flow correction and the latent $z_r$ associated with the Δ residual correction.

Based on receiving encoded video data including latent $z_m$ associated with the Δ optical flow correction and the latent $z_r$ associated with the Δ residual correction, the neural video decoder can generate (e.g., decode) the reconstructed inter-frame $\hat{X}_t$, without the neural video encoder transmitting a representation (e.g., latent) associated with the complete optical flow map or the complete residual map for the currently encoded inter-frame $X_t$, in some examples providing a bitrate savings of 30% or greater, without a drop in the accuracy or quality of the reconstructed inter-frame $\hat{X}_t$.

Figure 11:
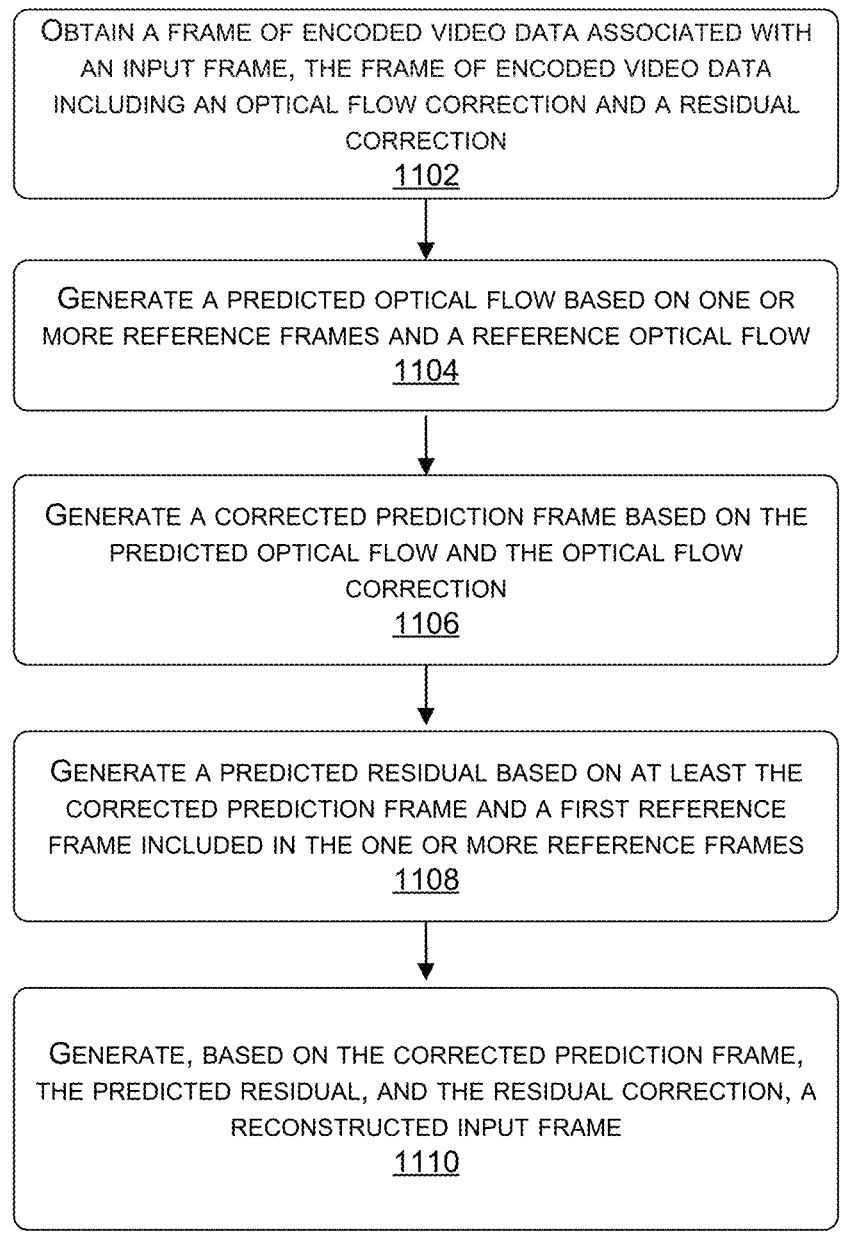
FIG. 11 is a flowchart illustrating an example of a process for processing video data, in accordance with some examples.

FIG. 11 is a flowchart illustrating an example of a process 1100 for processing video data. At block 1102, the process 1100 includes obtaining a frame of encoded video data associated with an input frame, wherein the frame of encoded video data includes an optical flow correction and a residual correction. For example, the optical flow correction can be obtained as a latent representation from an encoder network and/or an encoder network of an autoencoder network. In some cases, the optical flow correction can be obtained as the latent representation $z_m$ from the encoder network 805 illustrated in FIG. 8. In some examples, the residual correction can be obtained as a latent representation from a second encoder network and/or a second encoder network of a second autoencoder network. In some cases, the residual correction can be obtained as a latent representation $z_r$ from the encoder network 807 illustrated in FIG. 8. In some aspects, one or more (or both) of the optical flow correction and the residual correction can be a delta correction.

For example, the optical flow correction can be a delta-corrected optical flow map generated based on the input frame and an initial predicted frame. The initial predicted frame can be generated based on a predicted optical flow (e.g., described below with respect to block 1104). In some examples, the initial predicted frame can be generated using optical flow prediction engine 820 illustrated in FIG. 8 and/or optical flow prediction engine 920 illustrated in FIG. 9.

In some aspects, the optical flow correction can comprise a latent representation of the delta-corrected optical flow map. For example, the latent representation of the delta-corrected optical flow map can be generated using encoder network 805 of motion compression system 802 illustrated in FIG. 8. In some examples, the delta-corrected optical flow map can be generated using a decoder neural network of an optical flow compression system. In some aspects, the optical flow compression system is an optical flow autoencoder, the optical flow autoencoder including the decoder neural network.

At block 1104, the process 1100 includes generating a predicted optical flow based on one or more reference frames and a reference optical flow. For example, the predicted optical flow can be generated using optical flow prediction engine 820 illustrated in FIG. 8 and/or optical flow prediction engine 920 illustrated in FIG. 9. In some aspects, the predicted optical flow can be generated by an autoencoder 922 illustrated in FIG. 9. In some cases, the predicted optical flow can be generated based on inputs comprising the first reference frame, a second reference frame included in the one or more reference frames, and the reference optical flow. The reference optical flow and the first reference frame can be associated with the same previously reconstructed input frame.

In some examples, the predicted optical flow can be used to generate an initial predicted frame. For example, the initial predicted frame can be generated by warping the first reference frame based on the predicted optical flow. In some cases, the initial predicted frame can be generated using optical flow prediction engine 820 illustrated in FIG. 8 and/or optical flow prediction engine 920 illustrated in FIG. 9.

At block 1106, the process 1100 includes generating a corrected prediction frame based on the predicted optical flow and the optical flow correction. For example, the corrected prediction frame can be a motion compensated frame generated using warping engine 804 illustrated in FIG. 8, based on inputs of the predicted frame generated by optical flow prediction engine 820 and the delta-corrected optical flow map from motion compression system 802 (e.g., both also illustrated in FIG. 8).

At block 1108, the process 1100 includes generating a predicted residual based on at least the corrected prediction frame and a first reference frame included in the one or more reference frames. For example, the predicted residual can be generated using a residual prediction engine 830 illustrated in FIG. 8 and/or a residual prediction engine 930 illustrated in FIG. 9B. The predicted residual can be generated based on the corrected prediction frame, a reference prediction frame, and the first reference frame. The reference prediction frame and the first reference frame can be associated with a same previously reconstructed input frame. In some aspects, the residual correction can be a delta-corrected residual map generated based on a residual determined as a difference between the input frame and the corrected prediction frame. In some examples, the residual correction can comprise a latent representation of the delta-corrected residual map. In some cases, the delta-corrected residual map can be generated using a decoder neural network of a residual compression system, such as the decoder neural network 809 illustrated in FIG. 8 as being included in the residual compression system 806 also illustrated in FIG. 8. In some examples, the residual compression system is a residual autoencoder, the residual autoencoder including the decoder neural network. In some aspects, an initial reconstructed input frame prediction can be generated based on adding the predicted residual and the corrected prediction frame, for example using the summation operation 936 illustrated as being included in the residual prediction engine 930 illustrated in FIG. 9B.

At block 1110, the process 1100 includes generating, based on the corrected prediction frame, the predicted residual, and the residual correction, a reconstructed input frame. For example, the reconstructed input frame can be generated by adding the initial reconstructed input frame prediction and the residual correction, for example using the summation operation 810 illustrated in FIG. 8.

Figure 12:
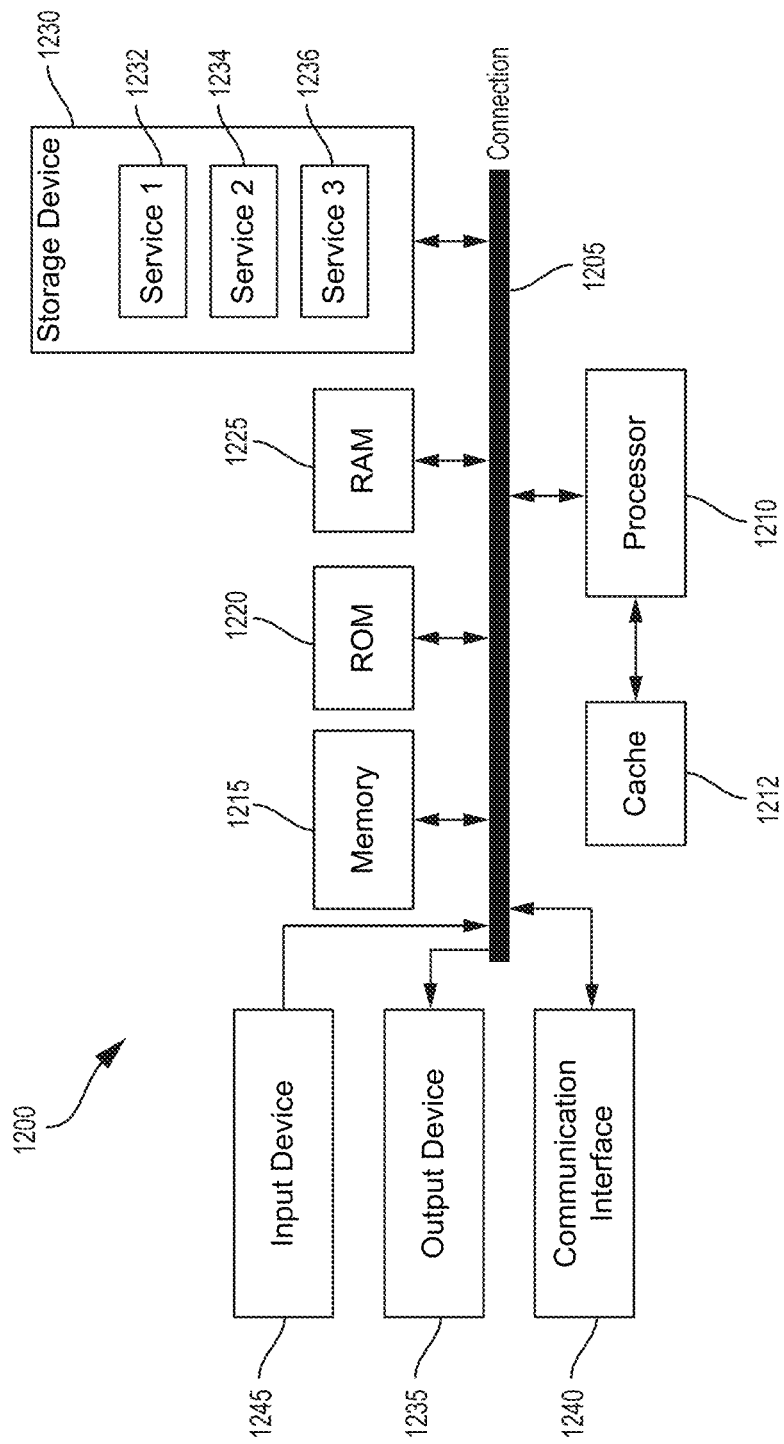
FIG. 12 illustrates an example computing system that can be used to implement various aspects described herein.

In some examples, the processes described herein (e.g., process 1100 and/or other process described herein) may be performed by a computing device or apparatus, such as a computing device having the computing device architecture 1200 shown in FIG. 12. The computing device can include any suitable device, such as an autonomous vehicle computer, a robotic device, a mobile device (e.g., a mobile phone), a desktop computing device, a tablet computing device, a wearable device, a server device, a video game device, an extended reality device (e.g., a virtual reality (VR) device, an augmented reality (AR) device, or a mixed reality (MR) device), a camera device, a set-top box device, and/or any other computing device with the resource capabilities to perform the processes described herein, including process 1100. In some examples, the computing device can include a mobile device, a wearable device, an XR device, a personal computer, a laptop computer, a video server, a television, a camera, a set-top box, a video game console, or other device. In some examples, the process 1100 can be performed by a computing device with the computing device architecture 1200 implementing the neural P-frame coding system 800 of FIG. 8.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), application-specific integrated circuits (ASICs), field-programmable gate arrays (FPGAs), and/or other suitable electronic circuits), and/or can include and/or be implemented using computer software, firmware, or any combination thereof, to perform the various operations described herein.

The process 1100 is illustrated as a logical flow diagram, the operations of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1100) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement the various techniques described herein. In some examples, the computing device can include a mobile device, a wearable device, an XR device, a personal computer, a laptop computer, a video server, a video game console, a robotic device, a set-top box, a television, a camera, a server, or other device. For example, the computing device architecture 1200 can implement the neural P-frame coding system 800 of FIG. 8. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific examples. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the examples.

Individual aspects and/or examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the present disclosure can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for decoding video data, the apparatus comprising: at least one memory; and at least one processor coupled to the at least one memory, the at least one processor configured to: obtain a frame of encoded video data associated with an input frame, the frame of encoded video data including an optical flow correction and a residual correction; generate a predicted optical flow based on one or more reference frames and a reference optical flow; generate a corrected prediction frame based on the predicted optical flow and the optical flow correction; generate a predicted residual based on at least the corrected prediction frame and a first reference frame included in the one or more reference frames; and generate, based on the corrected prediction frame, the predicted residual, and the residual correction, a reconstructed input frame.

Aspect 2: The apparatus of Aspect 1, wherein: the predicted optical flow is generated based on the first reference frame, a second reference frame included in the one or more reference frames, and the reference optical flow; and the reference optical flow and the first reference frame are associated with a same previously reconstructed input frame.

Aspect 3: The apparatus of any of Aspects 1 to 2, wherein: the optical flow correction is a delta-corrected optical flow map generated based on the input frame and an initial predicted frame; and the initial predicted frame is generated based on the predicted optical flow.

Aspect 4: The apparatus of Aspect 3, wherein the initial predicted frame is generated by warping the first reference frame based on the predicted optical flow.

Aspect 5: The apparatus of any of Aspects 3 to 4, wherein the optical flow correction comprises a latent representation of the delta-corrected optical flow map.

Aspect 6: The apparatus of any of Aspects 3 to 5, wherein the delta-corrected optical flow map is generated using a decoder neural network of an optical flow compression system.

Aspect 7: The apparatus of Aspect 6, wherein the optical flow compression system is an optical flow autoencoder, the optical flow autoencoder including the decoder neural network.

Aspect 8: The apparatus of any of Aspects 1 to 7, wherein: the predicted residual is generated based on the corrected prediction frame, a reference prediction frame, and the first reference frame; and the reference prediction frame and the first reference frame are associated with a same previously reconstructed input frame.

Aspect 9: The apparatus of Aspect 8, wherein the residual correction is a delta-corrected residual map generated based on a residual determined as a difference between the input frame and the corrected prediction frame.

Aspect 10: The apparatus of Aspect 9, wherein the residual correction comprises a latent representation of the delta-corrected residual map.

Aspect 11: The apparatus of any of Aspects 9 to 10, wherein the delta-corrected residual map is generated using a decoder neural network of a residual compression system.

Aspect 12: The apparatus of Aspect 11, wherein the residual compression system is a residual autoencoder, the residual autoencoder including the decoder neural network.

Aspect 13: The apparatus of any of Aspects 8 to 12, wherein the at least one processor is further configured to generate an initial reconstructed input frame prediction based on adding the predicted residual and the corrected prediction frame.

Aspect 14: The apparatus of Aspect 13, wherein the at least one processor is further configured to generate the reconstructed input frame based on adding the initial reconstructed input frame prediction and the residual correction.

Aspect 15: An apparatus for encoding video data, the apparatus comprising: at least one memory; and at least one processor coupled to the at least one memory, the at least one processor configured to: determine an optical flow and a residual correction associated with a frame of video data; generate a predicted optical flow based on one or more reference frames and a reference optical flow; determine an optical flow correction based on a difference between the predicted optical flow and the optical flow associated with the frame of video data; generate a corrected prediction frame based on the predicted optical flow and the optical flow correction; generate a predicted residual based on at least the corrected prediction frame and a first reference frame included in the one or more reference frames; and determine a residual correction based on a difference between the frame of video data and a reconstructed input frame generated based on the corrected prediction frame, and the predicted residual.

Aspect 16: The apparatus of Aspect 15, wherein: the predicted optical flow is generated based on the first reference frame, a second reference frame included in the one or more reference frames, and the reference optical flow; and the reference optical flow and the first reference frame are associated with a same previously reconstructed input frame.

Aspect 17: The apparatus of any of Aspects 15 to 16, wherein: the optical flow correction is a delta-corrected optical flow map generated based on the input frame and an initial predicted frame; and the initial predicted frame is generated based on the predicted optical flow.

Aspect 18: The apparatus of Aspect 17, wherein the initial predicted frame is generated by warping the first reference frame based on the predicted optical flow.

Aspect 19: The apparatus of any of Aspects 17 to 18, wherein the optical flow correction comprises a latent representation of the delta-corrected optical flow map.

Aspect 20: The apparatus of any of Aspects 17 to 19, wherein the delta-corrected optical flow map is generated using an encoder neural network of an optical flow compression system.

Aspect 21: The apparatus of Aspect 20, wherein the optical flow compression system is an optical flow autoencoder, the optical flow autoencoder including the encoder neural network.

Aspect 22: The apparatus of any of Aspects 15 to 21, wherein: the predicted residual is generated based on the corrected prediction frame, a reference prediction frame, and the first reference frame; and the reference prediction frame and the first reference frame are associated with a same previously reconstructed input frame.

Aspect 23: The apparatus of Aspect 22, wherein the residual correction is a delta-corrected residual map generated based on a residual determined as a difference between the input frame and the corrected prediction frame.

Aspect 24: The apparatus of Aspect 23, wherein the residual correction comprises a latent representation of the delta-corrected residual map.

Aspect 25: The apparatus of any of Aspects 23 to 24, wherein the delta-corrected residual map is generated using an encoder neural network of a residual compression system.

Aspect 26: The apparatus of Aspect 25, wherein the residual compression system is a residual autoencoder, the residual autoencoder including the encoder neural network.

Aspect 27: The apparatus of any of Aspects 22 to 26, wherein the at least one processor is further configured to generate an initial reconstructed input frame prediction based on adding the predicted residual and the corrected prediction frame.

Aspect 28: The apparatus of Aspect 27, wherein the at least one processor is further configured to generate the reconstructed input frame based on adding the initial reconstructed input frame prediction and the residual correction.

Aspect 29: A method for decoding video data, the method comprising: obtaining a frame of encoded video data associated with an input frame, the frame of encoded video data including an optical flow correction and a residual correction; generating a predicted optical flow based on one or more reference frames and a reference optical flow; generating a corrected prediction frame based on the predicted optical flow and the optical flow correction; generating a predicted residual based on at least the corrected prediction frame and a first reference frame included in the one or more reference frames; and generating, based on the corrected prediction frame, the predicted residual, and the residual correction, a reconstructed input frame.

Aspect 30: A method for encoding video data, the method comprising: determining an optical flow and a residual correction associated with a frame of video data; generating a predicted optical flow based on one or more reference frames and a reference optical flow; determining an optical flow correction based on a difference between the predicted optical flow and the optical flow associated with the frame of video data; generating a corrected prediction frame based on the predicted optical flow and the optical flow correction; generating a predicted residual based on at least the corrected prediction frame and a first reference frame included in the one or more reference frames; and determining a residual correction based on a difference between the frame of video data and a reconstructed input frame generated based on the corrected prediction frame, and the predicted residual.

Aspect 31: A non-transitory computer-readable storage medium having stored thereon instructions which, when executed by one or more processors, cause the one or more processors to perform any of the operations of Aspects 1 to 14 and Aspect 29.

Aspect 32: A non-transitory computer-readable storage medium having stored thereon instructions which, when executed by one or more processors, cause the one or more processors to perform any of the operations of Aspects 15 to 18 and Aspect 30.

Aspect 33: An apparatus comprising means for performing any of the operations of Aspects 1 to 14 and Aspect 29.

Aspect 34: An apparatus comprising means for performing any of the operations of Aspects 15 to 18 and Aspect 30.

What is claimed is:

1. An apparatus for decoding video data, the apparatus comprising:
   at least one memory; and
   at least one processor coupled to the at least one memory, the at least one processor configured to:
   generate a predicted optical flow based on one or more reference frames and a reference optical flow;
   warping, based on the predicted optical flow, a first reference frame included in the one or more reference frames to generate an initial predicted frame;
   obtain a frame of encoded video data associated with an input frame, the frame of encoded video data including an optical flow correction and a residual correction, wherein the optical flow correction is a delta-corrected optical flow map generated based on the input frame and the initial predicted frame;
   generate a corrected prediction frame based on the predicted optical flow and the optical flow correction;
   generate a predicted residual based on at least the corrected prediction frame and the first reference frame; and
   generate, based on the corrected prediction frame, the predicted residual, and the residual correction, a reconstructed input frame.

2. The apparatus of claim 1, wherein:
   the predicted optical flow is generated based on the first reference frame, a second reference frame included in the one or more reference frames, and the reference optical flow; and
   the reference optical flow and the first reference frame are associated with a same previously reconstructed input frame.

3. The apparatus of claim 1, wherein the optical flow correction comprises a latent representation of the delta-corrected optical flow map.

4. The apparatus of claim 1, wherein the delta-corrected optical flow map is generated using a decoder neural network of an optical flow compression system.

5. The apparatus of claim 4, wherein the optical flow compression system is an optical flow autoencoder, the optical flow autoencoder including the decoder neural network.

6. The apparatus of claim 1, wherein:
   the predicted residual is generated based on the corrected prediction frame, a reference prediction frame, and the first reference frame; and
   the reference prediction frame and the first reference frame are associated with a same previously reconstructed input frame.

7. The apparatus of claim 6, wherein the residual correction is a delta-corrected residual map generated based on a residual determined as a difference between the input frame and the corrected prediction frame.

8. The apparatus of claim 7, wherein the residual correction comprises a latent representation of the delta-corrected residual map.

9. The apparatus of claim 7, wherein the delta-corrected residual map is generated using a decoder neural network of a residual compression system.

10. The apparatus of claim 9, wherein the residual compression system is a residual autoencoder, the residual autoencoder including the decoder neural network.

11. The apparatus of claim 6, wherein the at least one processor is further configured to generate an initial reconstructed input frame prediction based on adding the predicted residual and the corrected prediction frame.

12. The apparatus of claim 11, wherein the at least one processor is further configured to generate the reconstructed input frame based on adding the initial reconstructed input frame prediction and the residual correction.

13. An apparatus for encoding video data, the apparatus comprising:
    at least one memory; and
    at least one processor coupled to the at least one memory, the at least one processor configured to:
    determine an optical flow and a residual correction associated with a frame of video data;
    generate a predicted optical flow based on one or more reference frames and a reference optical flow;
    determine an optical flow correction based on a difference between the predicted optical flow and the optical flow associated with the frame of video data;
    generate a corrected prediction frame based on the predicted optical flow and the optical flow correction;
    generate a predicted residual based on at least the corrected prediction frame, a reference prediction frame, and a first reference frame included in the one or more reference frames, wherein the reference prediction frame and the first reference frame are associated with a same previously reconstructed input frame; and
    determine a residual correction based on a difference between the frame of video data and a reconstructed input frame generated based on the corrected prediction frame, and the predicted residual.

14. The apparatus of claim 13, wherein:
    the predicted optical flow is generated based on the first reference frame, a second reference frame included in the one or more reference frames, and the reference optical flow; and
    the reference optical flow and the first reference frame are associated with the same previously reconstructed input frame.

15. The apparatus of claim 13, wherein:
    the optical flow correction is a delta-corrected optical flow map generated based on the frame of video data and an initial predicted frame; and
    the initial predicted frame is generated based on the predicted optical flow.

16. The apparatus of claim 15, wherein the initial predicted frame is generated by warping the first reference frame based on the predicted optical flow.

17. The apparatus of claim 15, wherein the optical flow correction comprises a latent representation of the delta-corrected optical flow map.

18. The apparatus of claim 15, wherein the delta-corrected optical flow map is generated using an encoder neural network of an optical flow compression system.

19. The apparatus of claim 18, wherein the optical flow compression system is an optical flow autoencoder, the optical flow autoencoder including the encoder neural network.

20. The apparatus of claim 15, wherein the residual correction is a delta-corrected residual map generated based on a residual determined as a difference between the frame of video data and the corrected prediction frame.

21. The apparatus of claim 20, wherein the residual correction comprises a latent representation of the delta-corrected residual map.

22. The apparatus of claim 20, wherein the delta-corrected residual map is generated using an encoder neural network of a residual compression system.

23. The apparatus of claim 22, wherein the residual compression system is a residual autoencoder, the residual autoencoder including the encoder neural network.

24. The apparatus of claim 15, wherein the at least one processor is further configured to generate an initial reconstructed input frame prediction based on adding the predicted residual and the corrected prediction frame.

25. The apparatus of claim 24, wherein the at least one processor is further configured to generate the reconstructed input frame based on adding the initial reconstructed input frame prediction and the residual correction.

26. A method for decoding video data, the method comprising:
    generating a predicted optical flow based on one or more reference frames and a reference optical flow;
    generating an initial predicted frame by warping a first reference frame included in the one or more reference frames based on the predicted optical flow;
    obtaining a frame of encoded video data associated with an input frame, the frame of encoded video data including an optical flow correction and a residual correction, wherein the optical flow correction is a delta-corrected optical flow map generated based on the input frame and the initial predicted frame;
    generating a corrected prediction frame based on the predicted optical flow and the optical flow correction;
    generating a predicted residual based on at least the corrected prediction frame and the first reference frame; and
    generating, based on the corrected prediction frame, the predicted residual, and the residual correction, a reconstructed input frame.

27. A method for encoding video data, the method comprising:
    determining an optical flow and a residual correction associated with a frame of video data;
    generating a predicted optical flow based on one or more reference frames and a reference optical flow;
    determining an optical flow correction based on a difference between the predicted optical flow and the optical flow associated with the frame of video data;
    generating a corrected prediction frame based on the predicted optical flow and the optical flow correction;
    generating a predicted residual based on at least the corrected prediction frame, a reference prediction frame, and a first reference frame included in the one or more reference frames, wherein the reference prediction frame and the first reference frame are associated with a same previously reconstructed input frame; and
    determining a residual correction based on a difference between the frame of video data and a reconstructed input frame generated based on the corrected prediction frame, and the predicted residual.

* * * * *